United States Patent
Nomizo et al.

(10) Patent No.: US 11,338,484 B2
(45) Date of Patent: May 24, 2022

(54) MEMBER JOINING METHOD

(71) Applicant: Toyota Jidosha Kabushiki Kaisha, Toyota (JP)

(72) Inventors: Fumio Nomizo, Toyota (JP); Shoichi Tsuchiya, Toyota (JP); Tatsuya Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 16/444,562

(22) Filed: Jun. 18, 2019

(65) Prior Publication Data
US 2019/0389105 A1 Dec. 26, 2019

(30) Foreign Application Priority Data
Jun. 20, 2018 (JP) .............................. JP2018-117397

(51) Int. Cl.
| | |
|---|---|
| *B29C 45/14* | (2006.01) |
| *F16L 13/10* | (2006.01) |
| *F16L 13/11* | (2006.01) |
| *B29K 101/12* | (2006.01) |
| *B29L 23/00* | (2006.01) |
| *B62D 25/14* | (2006.01) |
| *B62D 27/02* | (2006.01) |
| *B62D 65/02* | (2006.01) |

(52) U.S. Cl.
CPC .... *B29C 45/14467* (2013.01); *B29C 45/1418* (2013.01); *B29C 45/14491* (2013.01); *F16L 13/103* (2013.01); *F16L 13/11* (2013.01); *B29C 2045/14524* (2013.01); *B29K 2101/12* (2013.01); *B29L 2023/22* (2013.01); *B62D 25/145* (2013.01); *B62D 27/026* (2013.01); *B62D 65/02* (2013.01)

(58) Field of Classification Search
None
See application file for complete search history.

(56) References Cited

U.S. PATENT DOCUMENTS

| | | | | | |
|---|---|---|---|---|---|
| 3,469,579 | A | * | 9/1969 | Hubert ................... | B29C 66/131 604/533 |
| 3,498,866 | A | * | 3/1970 | Kilbane ............... | B29C 66/1122 156/285 |
| 3,847,694 | A | * | 11/1974 | Stewing ............. | B29K 2027/06 156/86 |

(Continued)

FOREIGN PATENT DOCUMENTS

| | | |
|---|---|---|
| CN | 1342254 A | 3/2002 |
| EP | 0824930 * | 2/1998 |

(Continued)

*Primary Examiner* — Edmund H Lee
(74) *Attorney, Agent, or Firm* — Dinsmore & Shohl LLP

(57) ABSTRACT

A member joining method includes: a placement process of arranging a first member and a second member inserted into the first member so that a gap surrounding the second member is provided between the first member and the second member; a filling process of filling a molten resin into the gap and applying pressure to the resin so as to cause at least one member of the first member or the second member to undergo elastic deformation; and a pressure maintaining process of maintaining the pressure until the resin that has been filled into the gap has cured.

13 Claims, 20 Drawing Sheets

(56) References Cited

U.S. PATENT DOCUMENTS

| | | | | |
|---|---|---|---|---|
| 3,920,268 | A * | 11/1975 | Stewing | B29C 66/73715 |
| | | | | 285/21.1 |
| 4,191,185 | A * | 3/1980 | Lemieux | A61M 25/0014 |
| | | | | 604/533 |
| 4,196,923 | A * | 4/1980 | Zimmerli | C09J 5/02 |
| | | | | 228/119 |
| 4,776,849 | A * | 10/1988 | Shinno | A61M 25/0014 |
| | | | | 604/533 |
| 5,380,301 | A * | 1/1995 | Prichard | A61M 25/0014 |
| | | | | 604/533 |
| 6,595,559 | B1 | 7/2003 | Readman | |
| 9,915,381 | B2 * | 3/2018 | Doole | B29C 66/1224 |
| 10,138,925 | B2 * | 11/2018 | Nakamura | F16D 1/068 |
| 2003/0220628 | A1 * | 11/2003 | Klisch | A61M 25/0097 |
| | | | | 604/524 |
| 2009/0157052 | A1 * | 6/2009 | Verbitsky | B29C 45/14467 |
| | | | | 604/533 |
| 2016/0059900 | A1 | 3/2016 | Eshima et al. | |
| 2016/0336199 | A1 * | 11/2016 | Harada | H01L 21/3105 |
| 2017/0071423 | A1 | 3/2017 | Hayashida et al. | |
| 2017/0320247 | A1 * | 11/2017 | Aizawa | B29C 45/14311 |

FOREIGN PATENT DOCUMENTS

| | | |
|---|---|---|
| JP | 2013155757 A | 8/2013 |
| JP | 2014210548 A | 11/2014 |
| JP | 2017-055979 A | 3/2017 |
| WO | 9605440 A1 | 2/1996 |

\* cited by examiner

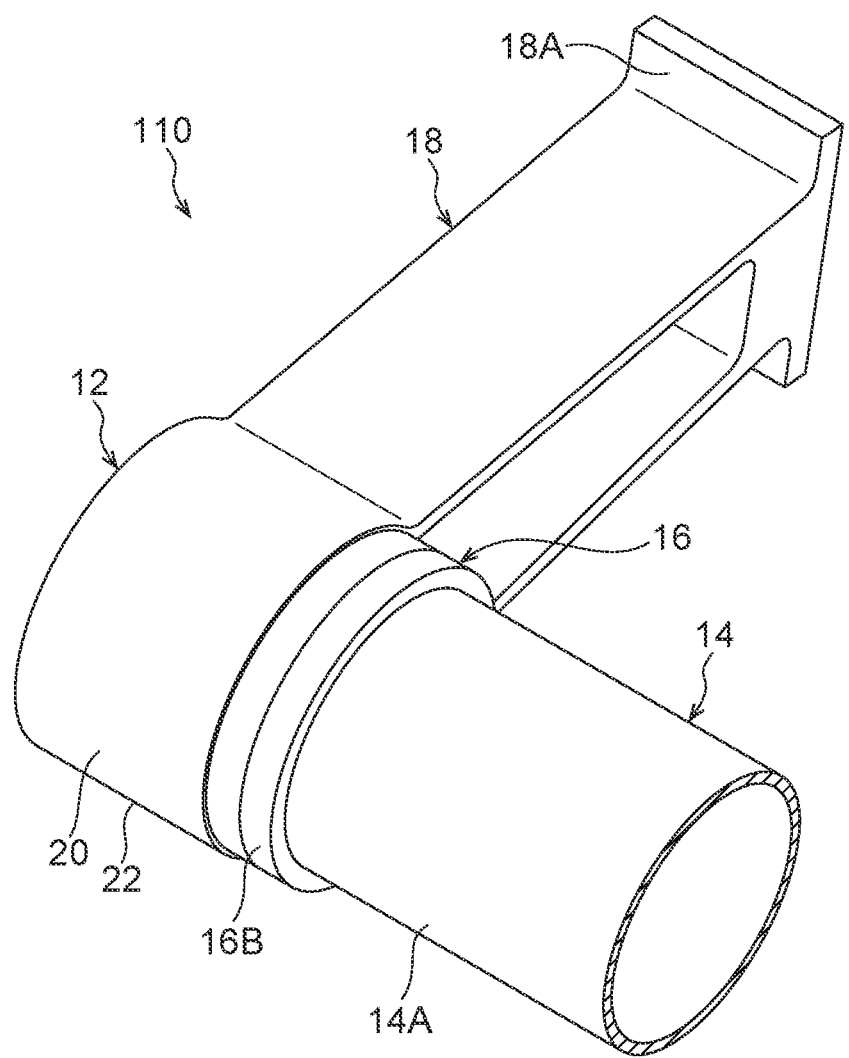

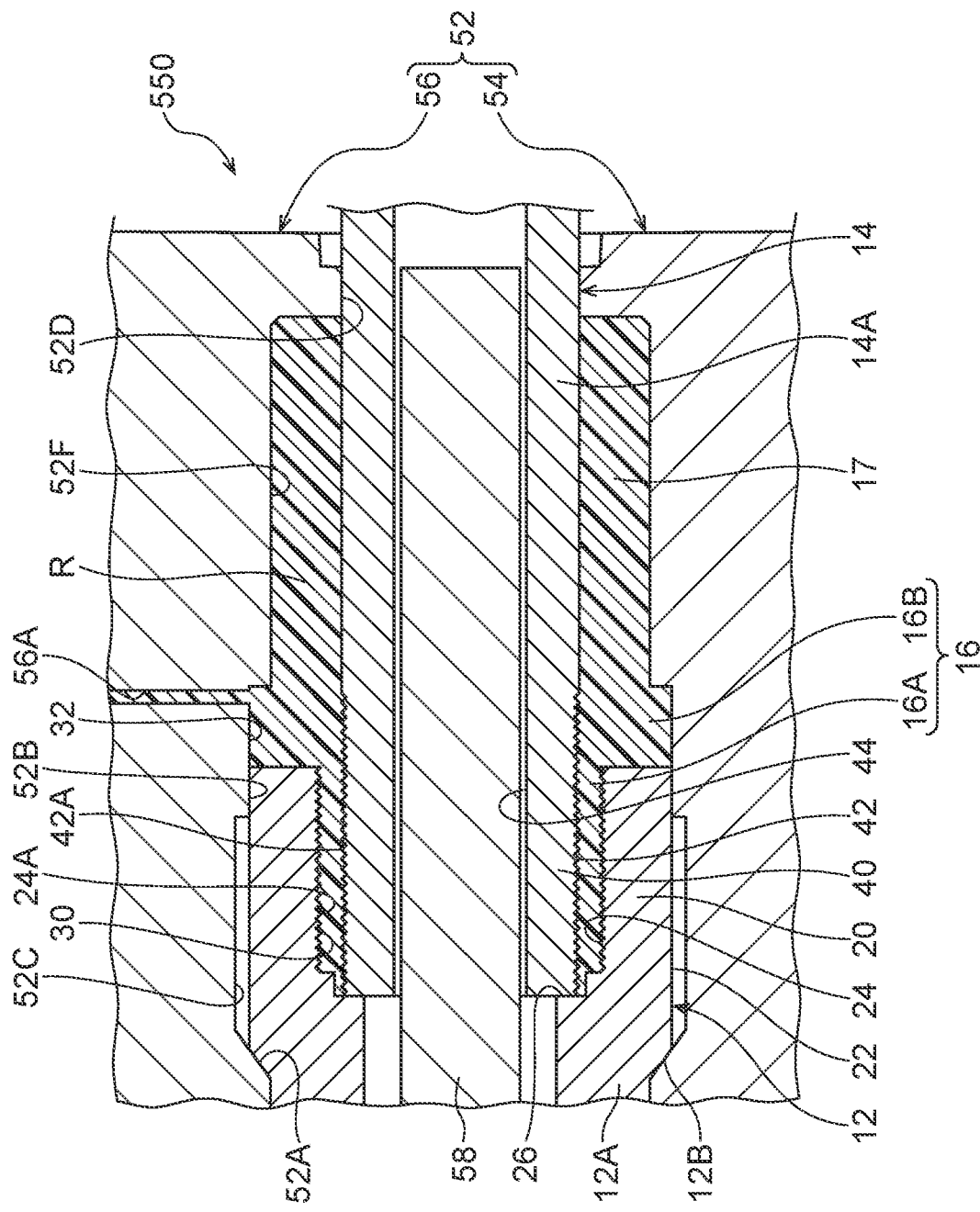

MEMBER JOINING METHOD

CROSS-REFERENCE TO RELATED APPLICATION

This application is based on and claims priority under 35 USC 119 from Japanese Patent Application No. 2018-117397 filed on Jun. 20, 2018, the disclosure of which is incorporated by reference herein.

BACKGROUND

Technical Field

The present disclosure relates to a member joining method and a member joining device.

Related Art

Japanese Patent Application Laid-Open (JP-A) No. 2014-210548 discloses a vehicle cabin front section structure of a vehicle provided with instrument panel reinforcement spanning between left and right front pillars. In the instrument panel reinforcement of the vehicle cabin front section structure, a large diameter portion on a driver's seat side and a small diameter portion provided at a vehicle width direction central side and front passenger seat side are joined together by laser welding. However, from the perspectives of joint strength and cost, welding may not be suitable in cases in which the large diameter portion and the small diameter portion are made of aluminum or in cases in which the large diameter portion and the small diameter portion are made of different types of metal to each other.

JP-A No. 2013-155757 discloses a joint structure for tubes of different metals. In this joint structure, an aluminum pipe and a stainless steel pipe are joined together by filling an epoxy resin adhesive into a gap between the two pipes in a state in which the stainless steel pipe has been inserted into the aluminum pipe. Employing the joint structure disclosed in this document enables aluminum pipes to be joined together, and also enables pipes made of different types of metal to each other to be joined together.

However, in cases in which a resin adhesive is employed in a joint structure as described above, contraction of the resin as it cures generates internal stress acting in a direction to detach from the member, with the result that joint strength is difficult to secure. This issue affects not only cases in which metals are joined together, but also cases in which resins are joined together and cases in which a metal and a resin are joined together.

SUMMARY

An object of the present disclosure is to provide a member joining method and a member joining device capable of securing joint strength in cases in which plural members are joined together using a resin.

A member joining method of a first aspect includes a placement process of arranging a first member and a second member inserted into the first member so that a gap surrounding the second member is provided between the first member and the second member, a filling process of filling a molten resin into the gap and applying pressure to the resin so as to cause at least one member of the first member or the second member to undergo elastic deformation, and a pressure maintaining process of maintaining the pressure until the resin that has been filled into the gap has cured.

In the member joining method of the first aspect, the second member is inserted into the first member, and the molten resin is filled into the gap formed between the first member and the second member so as to surround the second member, thereby joining the two members together. In this joining method, pressure is applied to the resin filled into the gap between the members, so as to cause at least one of the members to generate elastic force by deforming, and the pressure is maintained until the filled resin has cured. The resin resulting from curing receives elastic force from the at least one member. Note that "elastic deformation" includes cases accompanied by plastic deformation, as long as elastic force is generated. Moreover, in addition to cases in which a predetermined pressure value is maintained, "maintaining the pressure" also includes cases in which the pressure value fluctuates as long as the elastic force generated by the at least one member is maintained. In this joining method, the resin generates reaction force toward the at least one member due to receiving elastic force from this member, enabling joint strength to be secured.

A member joining method of a second aspect is the member joining method of the first aspect, wherein in the placement process, an abutting body is arranged so as to abut the at least one member undergoing elastic deformation, and the member joining method further including a separation process of separating the abutting body from the joined first member and second member after the pressure maintaining process.

In the member joining method of the second aspect, the abutting body is provided so as to abut the at least one member undergoing elastic deformation when the molten resin is filled into the gap. The abutting body may be provided in the form of a mold for filling the resin into the gap. This joining method enables a position where elastic force is generated when molten resin has been filled into the gap to be controlled.

A member joining method of a third aspect is the member joining method of the second aspect, wherein in the filling process, the molten resin is filled into the gap and into a cavity provided in the abutting body, and in the separation process, the abutting body is separated from a resin component that is continuously formed along a join section between the first member and the second member and that has a shape corresponding to the cavity.

The member joining method of the third aspect enables the resin component connected to the two members to be formed at the same time as the two members are joined together. Namely, the resin component can be provided to a member such as a pipe without providing extra processes.

A member joining method of a fourth aspect is the member joining method of the second or the third aspect, wherein the first member includes a tubular portion. In the placement process, an outer abutting body configuring the abutting body is arranged at an outer peripheral side of the tubular portion, and in the filling process, a diameter of the tubular portion is enlarged so as to abut an inner peripheral portion of the outer abutting body.

The member joining method of the fourth aspect is applied to join together a tube-shaped first member and a rod shaped second member. This joining method enables a resin join section that is continuous around a circumferential direction to be provided, enabling a uniform reaction force to be imparted to the members from the join section. This enables the joint strength after the resin has cured to be improved in comparison to cases in which the join section is not continuous around the circumferential direction.

A member joining method of a fifth aspect is the member joining method of the fourth aspect, wherein the first member includes one or more communication paths that places an outer peripheral portion side and an inner peripheral portion side of the tubular portion in communication with each other, and that are connected to the gap. In the filling process, the resin is filled such that the resin reaches the one or more communication paths.

The member joining method of the fifth aspect is applied when joining the first member including the one or plural communication paths that place the outer peripheral portion side and the inner peripheral portion side of the first member in communication with each other. The one or plural communication paths in the first member are connected to the gap, such that resin filled into the gap flows into the one or plural communication paths. In this joining method, the molten resin is filled so as to reach the one or plural communication paths, thereby enabling the filling condition of the resin into the gap to be ascertained.

A member joining method of a sixth aspect is the member joining method of the fifth aspect, further including a process of forming a groove section configured from plural grooves on an outer peripheral portion of the first member at a periphery of the one or more communication paths. In the placement process, the first member is abutted by the abutting body such that the one or more communication paths and the groove section are covered, and in the filling process, the resin is filled so as to pass through the one or more communication paths to reach the groove section.

The member joining method of the sixth aspect is applied when joining the first member including the one or plural communication paths that place the outer peripheral portion side and the inner peripheral portion side of the first member in communication with each other, and the groove section formed on the outer peripheral portion at the periphery of the one or plural communication paths. The one or plural communication paths of the first member are connected to the gap, and the groove section configured from the plural rooves is formed on the outer peripheral portion at the periphery of the one or plural communication paths. The first member is abutted by the abutting body such that the one or the plural communication paths and the groove section are covered, and the resin thereby enters the grooves of the groove section connected to the one or plural communication paths after having filled the gap and having filled the one or plural communication paths. In this joining method, the molten resin is filled so as to reach the groove section, thereby enabling the filling condition of the resin into the gap to be ascertained.

A member joining method of a seventh aspect is the member joining method of any one of the fourth to the sixth aspect, wherein in the placement process, the second member and the outer abutting body are arranged so as to form a space between the outer abutting body and the second member, a portion of the space that is adjacent to the gap and into which the resin is injected having a greater width than the gap, and in the filling process, the resin passes through the space before filling into the gap.

In the member joining method of the seventh aspect, the portion of the space into which the resin is injected has a greater width than the gap. In this joining method, resin is injected into the gap through the space that is adjacent to the gap, thereby enabling the resin to be evenly injected through the space into the gap after the resin has filled into the space. This enables pressure to be evenly applied to the first member and the second member.

A member joining method of an eighth aspect is the member joining method of any one of the second to the seventh aspect, wherein the second member includes a tube-shaped shaft portion. In the placement process, an inner abutting body configuring the abutting body is arranged at an inner peripheral side of the shaft portion, and in the filling process, a diameter of the shaft portion is decreased so as to abut an outer peripheral portion of the inner abutting body.

The member joining method of the eighth aspect is applied when joining together a tube-shaped first member and a tube-shaped second member. This joining method enables a resin join section that is continuous around a circumferential direction to be provided, enabling a uniform reaction force to be imparted to the members from the join section. This enables the joint strength after the resin has cured to be improved in comparison to cases in which the join section is not continuous around the circumferential direction. Moreover, the second member is capable of undergoing elastic deformation as well as the first member, enabling joint strength to be further improved.

A member joining method of a ninth aspect is the member joining method of any one of the first to the eighth aspect, further including a surface treatment process that is performed prior to the placement process and in which a roughened portion is formed at a part or a surface of the first member and a part of a surface of the second member. In the placement process, the gap is arranged at a portion where the roughened portion of the first member and the roughened portion of the second member face each other.

In the member joining method of the ninth aspect, the roughened portions are respectively formed at the members to be joined, and the roughened portions of the two members are made to face each other to form the gap. In this joining method, the molten resin cures in a state having entered the roughened portions, thereby enabling joint strength in the direction in which the two members could come apart to be improved in comparison to cases in which the roughened portions are not formed.

A member joining device of a tenth aspect includes an abutting body that abuts a member undergoing elastic deformation, the member being a first member or a second member different from the first member, a retaining mechanism that arranges the first member and the second member so that a gap is provided between the first member and the second member, and that retains the abutting body so as to abut the member undergoing elastic deformation, and a filling mechanism that fills molten resin into the gap, and that applies pressure to the resin such that at least one of the first member or the second member undergoes elastic deformation until the resin has cured.

The member joining device of the tenth aspect includes the abutting body that abuts the member undergoing elastic deformation, and the two members are joined together by filling molten resin from the filling mechanism into the gap formed between the first member and the second member by the retaining mechanism. In this joining device, elastic force is generated by applying pressure when filling resin into the gap between the members so as to deform at least one of the members, and the pressure is maintained until the filled resin has cured. The resin receives elastic force from the at least one member on being cured. In this joining device, the resin generates reaction force toward the at least one member due to receiving elastic force from this member, enabling joint strength to be secured. Moreover, in this joining device, the member undergoing elastic deformation contacts the abutting body when molten resin is filled into the gap, thereby enabling the position where elastic force is generated in this member to be controlled.

The present disclosure enables joint strength to be secured in cases in which plural members are joined together using a resin.

BRIEF DESCRIPTION OF THE DRAWINGS

Exemplary embodiments of the present disclosure will be described in detail based on the following figures, wherein:

FIG. 8A is a perspective view of a composite member according to a Modified Example 2 of the first exemplary embodiment;

FIG. 13 is a side view cross-section of a composite member according to the third exemplary embodiment;

DETAILED DESCRIPTION

Explanation follows regarding a composite member, and a manufacturing device and a manufacturing method thereof, according to exemplary embodiments of the present disclosure, with reference to the drawings.

First Exemplary Embodiment

Composite Member

Figure 1A:
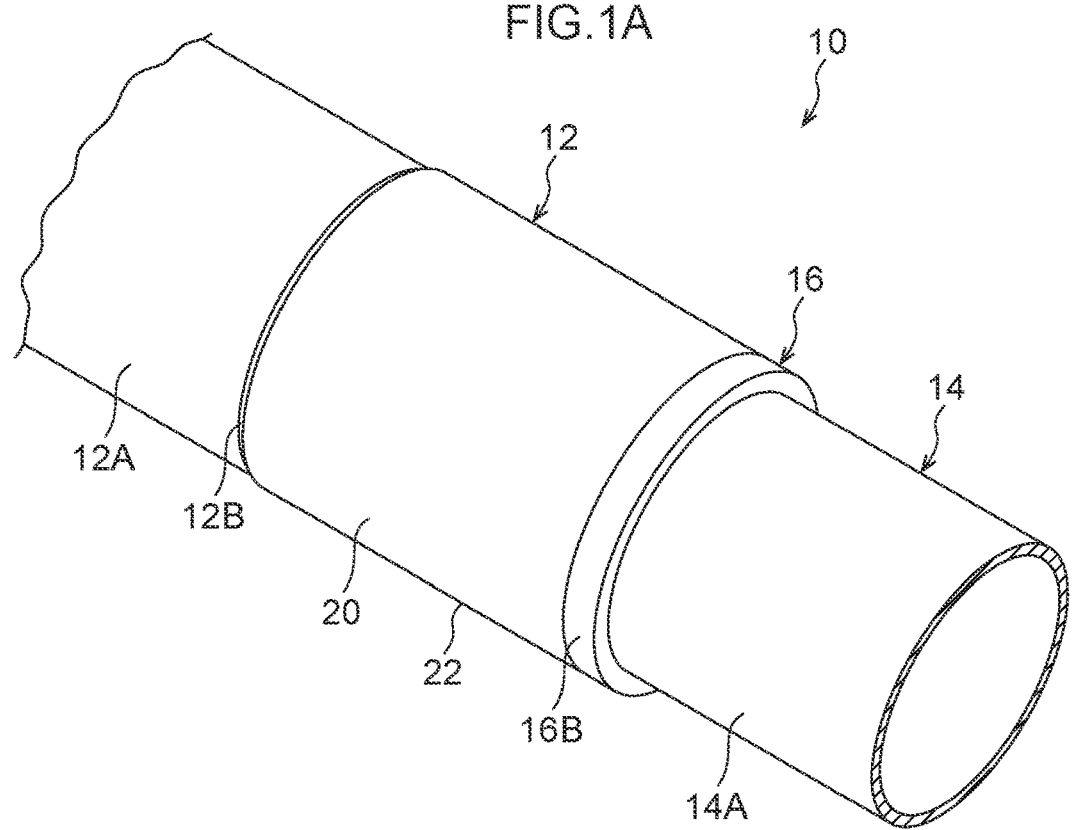
FIG. 1A is a perspective view of a composite member according to a first exemplary embodiment.
Figure 1B:
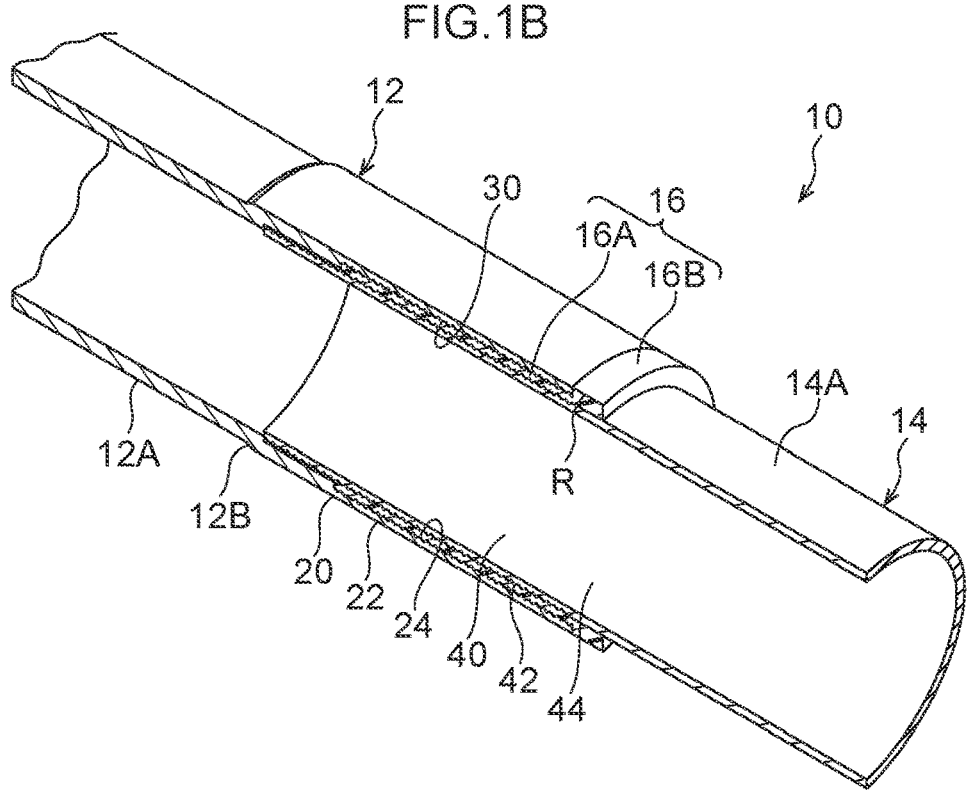
FIG. 1B is a cross-section (a cross-section of FIG. 1A) of a composite member according to the first exemplary embodiment.

FIG. 1A illustrates an external view of a composite member 10 of a first exemplary embodiment. The composite member 10 of the present exemplary embodiment is, for example, applied to instrument panel reinforcement disposed at the front of a vehicle cabin of a vehicle. The composite member 10 of the present exemplary embodiment is configured including a tube-shaped first pipe 12 serving as a first member, a tube-shaped second pipe 14 serving as a second member, and a resin section 16 provided between the first pipe 12 and the second pipe 14. The first pipe 12 and the second pipe 14 of the present exemplary embodiment are configured from aluminum alloy. As illustrated in FIG. 1B, the second pipe 14 and the first pipe 12 are joined together in a state in which the second pipe 14 has been inserted into the first pipe 12. The resin section 16 of the present exemplary embodiment corresponds to a join section that joins the first pipe 12 and the second pipe 14 together.

Figure 2:
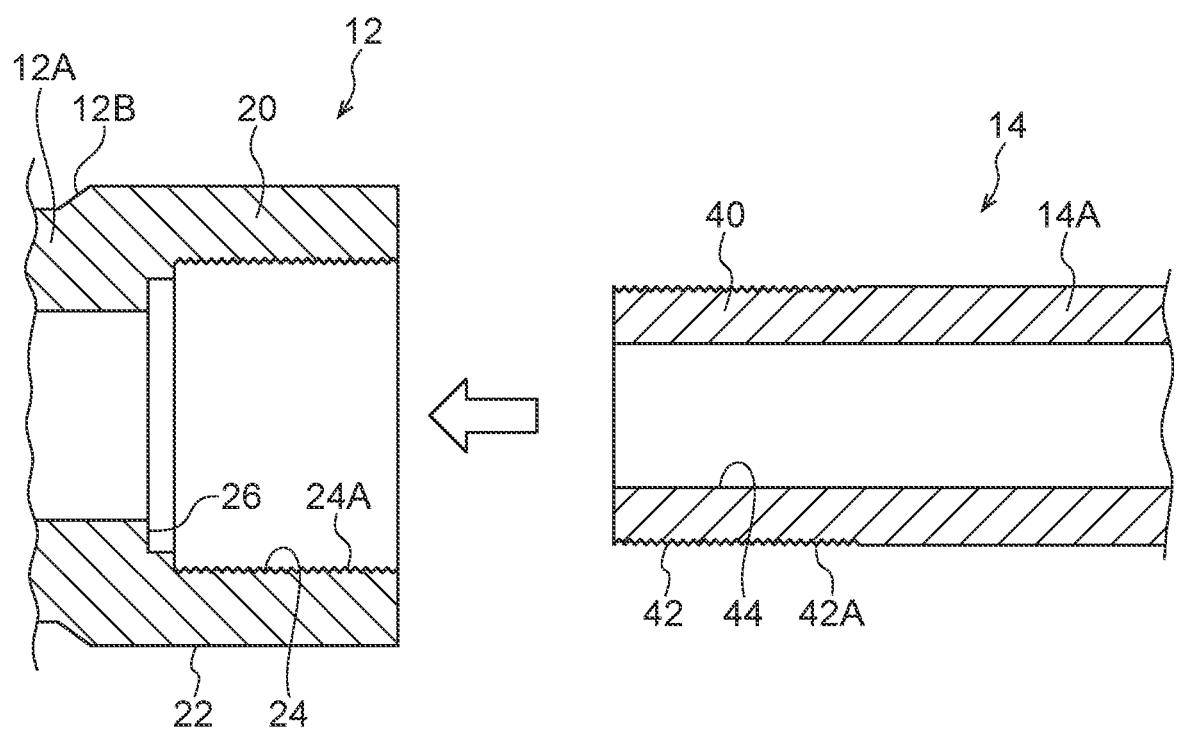
FIG. 2 is a side view cross-section of a first pipe and a second pipe according to the first exemplary embodiment.

As illustrated in FIG. 1B and FIG. 2, the first pipe 12 includes an elongated circular tube-shaped main body 12A, and a circular tube-shaped tubular portion 20 that is adjacent to the main body 12A and has a larger external diameter than the main body 12A. An outer peripheral portion 22 of the tubular portion 20 is positioned further toward a radial direction outside than an outer peripheral portion of the main body 12A. The outer peripheral portion 22 of the tubular portion 20 and the outer peripheral portion of the main body 12A are connected by a tapered face 12B such that no step is formed. Note that the external diameter of the tubular portion 20 may be the same as the external diameter of the main body 12A. Moreover, an inner peripheral portion 24 of the tubular portion 20 is positioned further toward the radial direction outside than an inner peripheral portion of the main body 12A. The diameter becomes progressively smaller on progression from the inner peripheral portion 24 of the tubular portion 20 toward the inner peripheral portion of the main body 12A, and a reduced diameter portion adjacent to the inner peripheral portion 24 forms an insertion portion 26 for the second pipe 14. The internal diameter of the insertion portion 26 is larger than the external diameter of a shaft portion 40, described later, of the second pipe 14. The inner peripheral portion 24 is formed with plural roughened portions 24A configured by grooves extending around a circumferential direction of the inner peripheral portion 24 and arranged along the axial direction of the inner peripheral portion 24.

The second pipe 14 includes an elongated circular tube-shaped main body 14A and the circular tube-shaped shaft portion 40 that is adjacent to the main body 14A and has the same diameter as the main body 14A. Namely, the second pipe 14 of the present exemplary embodiment is a pipe with a uniform external diameter. The external diameter of the second pipe 14 is smaller than the internal diameter of the tubular portion 20. When the second pipe 14 has been inserted into the first pipe 12, a gap 30 is formed between the inner peripheral portion 24 of the tubular portion 20 and an outer peripheral portion 42 of the shaft portion 40 (see FIG. 3). The outer peripheral portion 42 of the shaft portion 40 is formed with plural roughened portions 42A configured by grooves extending around a circumferential direction of the outer peripheral portion 42 and arranged along the axial direction of the outer peripheral portion 42. The roughened portions 42A face the roughened portions 24A across the gap 30.

As illustrated in FIG. 1B, the resin section 16 is configured including a pressure receiving portion 16A that is disposed in the gap 30 between the inner peripheral portion 24 and the outer peripheral portion 42, and a ring shaped annular portion 16B that is adjacent to the pressure receiving portion 16A and has a greater radial direction thickness than the pressure receiving portion 16A. The resin section 16 is formed by filling a molten resin R into the gap 30 and a space 32, described later. A thermoplastic resin such as a polyamide (PA) or polyphenylene sulfide (PPS) is selected as the resin R configuring the resin section 16.

Joining Device

Figure 3:
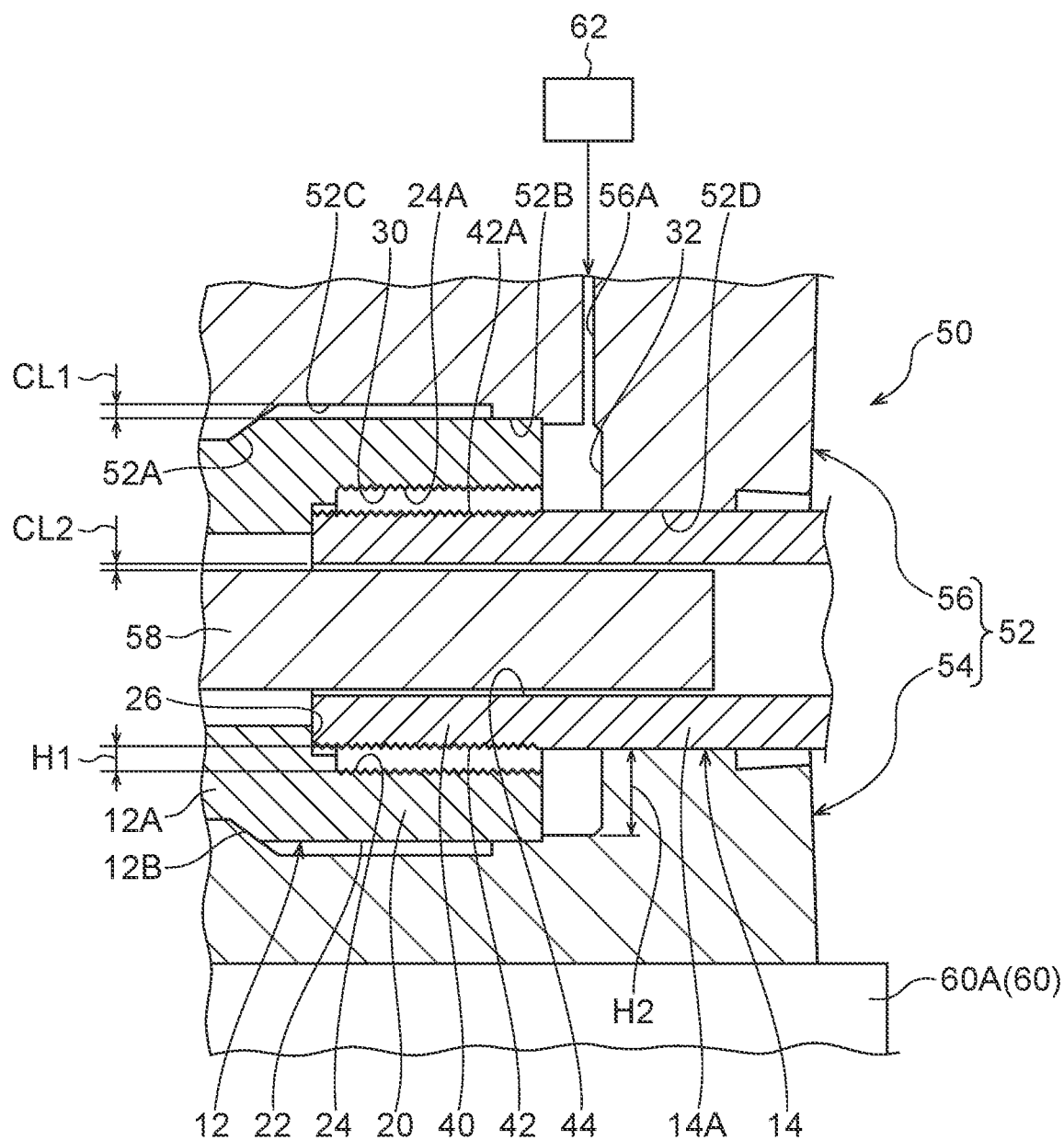
FIG. 3 is a side view cross-section of a first pipe and a second pipe arranged in a joining device according to the first exemplary embodiment.

FIG. 3 illustrates a joining device 50 employed in the manufacture of the composite member 10. The joining device 50 of the present exemplary embodiment is configured including a mold 52, serving as an outer abutting body, an insert 58, serving as an inner abutting body, a retaining mechanism 60, and a filling mechanism 62.

The mold 52 includes a lower mold 54 that retains the first pipe 12 and the second pipe 14 from below, and an upper mold 56 that retains the first pipe 12 and the second pipe 14 from above. The lower mold 54 and the upper mold 56 each include a semicircular tube-shaped cavity that houses the first pipe 12 and the second pipe 14. The following explanation describes the mold 52 in a state in which the upper mold 56 and the lower mold 54 are mated with each other from above and below.

The mold 52 includes a first abutting portion 52A that abuts one axial direction end (the tapered face 12B of the first pipe 12) of the outer peripheral portion 22 of the tubular portion 20, and a second abutting portion 52B that abuts another axial direction end (the outer peripheral face of an end portion of the first pipe 12) of the outer peripheral portion 22 of the tubular portion 20. The mold 52 also includes a recess 52C that is recessed toward the radial direction outside between the first abutting portion 52A and the second abutting portion 52B.

Figure 4:
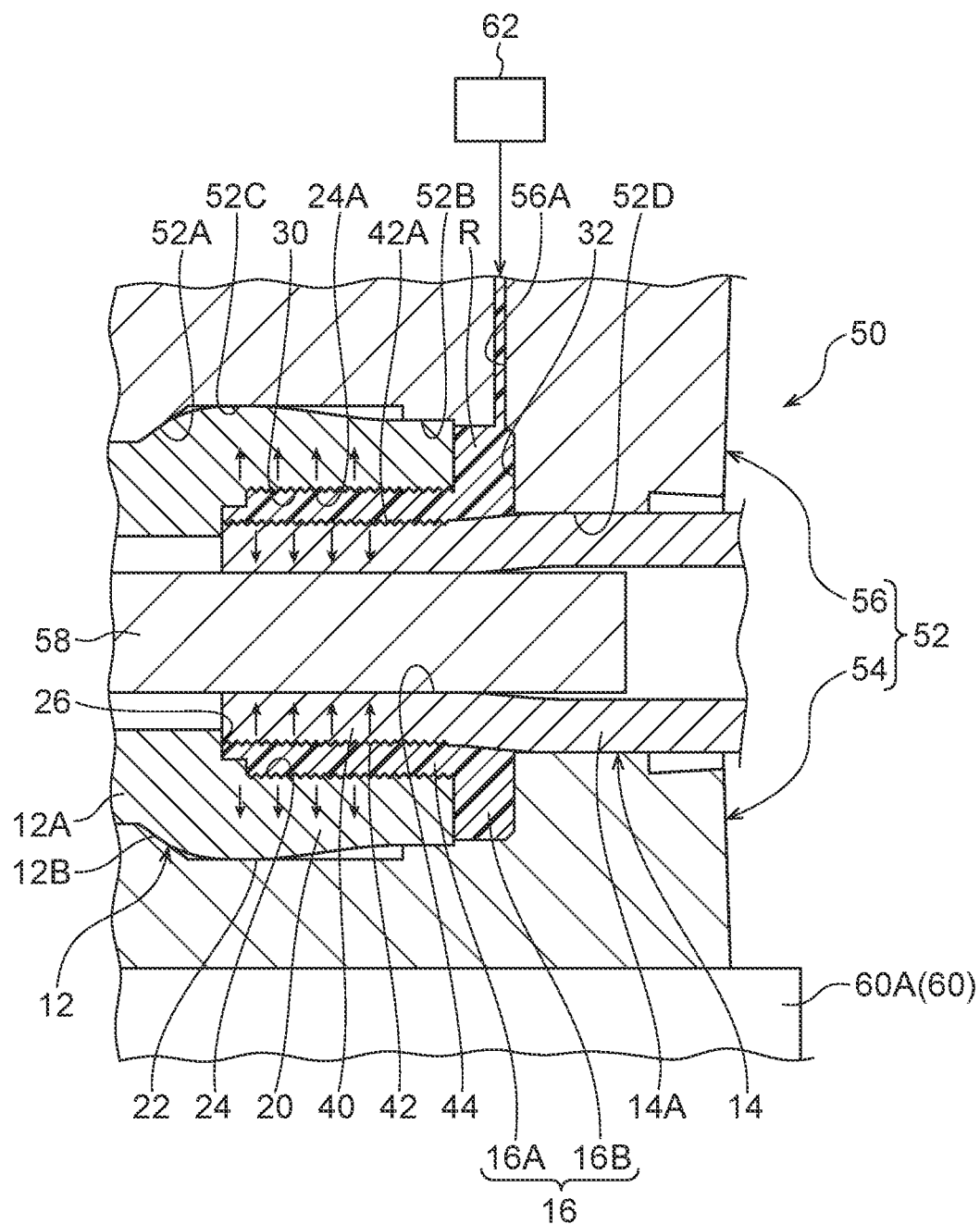
FIG. 4 is a side view cross-section of a joining device according to the first exemplary embodiment when resin has been filled therein.

In the present exemplary embodiment, in a filling process, described later, the outer peripheral portion 22 of the tubular portion 20 is formed so as to abut an inner peripheral face of the recess 52C when the first pipe 12 has deformed (see FIG. 4). Note that a clearance CL1, this being the distance between the outer peripheral portion 22 of the tubular portion 20 and the inner peripheral face of the recess 52C, is set within a deformation amount range of the tubular portion 20 when elastic force arises in the tubular portion 20, and is set within an elastic deformation amount range of the tubular portion 20. Namely, although deformation of the first pipe 12 in the present exemplary embodiment is elastic deformation in principle, some slight plastic deformation may accompany this as long as elastic force is generated.

The mold 52 further includes a third abutting portion 52D that abuts an outer peripheral portion of the second pipe 14 (the main body 14A). The second abutting portion 52B and the third abutting portion 52D are separated from each other in the axial direction, and the third abutting portion 52D is positioned at the radial direction inside of the second abutting portion 52B. When the first pipe 12 and the second pipe 14 have been arranged in the mold 52, the space 32 is formed in a region bordered by an end face of the tubular portion 20, a connection portion of the mold 52 spanning between the second abutting portion 52B and the third abutting portion 52D, and the outer peripheral portion of the main body 14A.

A gate runner 56A that is in communication with the space 32 is provided in the upper mold 56. The resin R discharged from the filling mechanism 62 in a molten state flows in through the gate runner 56A. Note that the location where a gate runner for injection of the resin R into the space 32 is set is not limited to the upper mold 56. For example, such a gate runner may be provided to the lower mold 54, or may be provided along a parting line between the lower mold 54 and the upper mold 56.

The insert 58 is a rod shaped member that has a smaller external diameter than the internal diameter of the second pipe 14 (an inner peripheral portion 44). In the present exemplary embodiment, the insert 58 is formed such that the inner peripheral portion 44 of the shaft portion 40 abuts an outer peripheral face of the insert 58 when the second pipe 14 deforms during the filling process, described later (see FIG. 4). Note that a clearance CL2, this being the distance between the inner peripheral portion 44 of the shaft portion 40 and the outer peripheral face of the insert 58 is set within a deformation amount range of the shaft portion 40 when elastic force arises in the shaft portion 40, and is set within a range of an elastic deformation amount of the shaft portion 40. Namely, although deformation of the second pipe 14 in the present exemplary embodiment is elastic deformation in principle, some slight plastic deformation may accompany this as long as elastic force is generated.

The retaining mechanism 60 is configured including a fixed plate 60A that retains the lower mold 54, a moving plate that retains the upper mold 56, a first drive device that moves the moving plate, and a second drive device that drives the insert 58. In a placement process, described later, the retaining mechanism 60 of the present exemplary embodiment arranges the first pipe 12, the second pipe 14, the mold 52, and the insert 58 such that these members adopt a predetermined placement relationship.

In the "predetermined placement relationship" referred to above, the gap 30 is formed between the inner peripheral portion 24 of the tubular portion 20 and the outer peripheral portion 42 of the shaft portion 40, and the space 32 is formed at the portion bordered by the tubular portion 20, the main body 14A, and the mold 52. Note that a radial direction height H2 of the space 32 is greater than a radial direction height H1 of the gap 30. The height H2 of the space 32 is at least three times the height H1 of the gap 30. Moreover, the volume of the space 32 is also greater than the volume of the gap 30. In the "predetermined placement relationship", the molten resin R fills from the gap 30 to the space 32.

The filling mechanism 62 is an injection molding apparatus that fills the molten resin R into the space 32 and the gap 30. The filling mechanism 62 of the present exemplary embodiment is capable of pressure-deforming the tubular portion 20 of the first pipe 12 and the shaft portion 40 of the second pipe 14 when filling the molten resin R into the gap 30 between the inner peripheral portion 24 of the tubular portion 20 and the outer peripheral portion 42 of the shaft portion 40 (see FIG. 4).

Manufacturing Method

Figure 5:
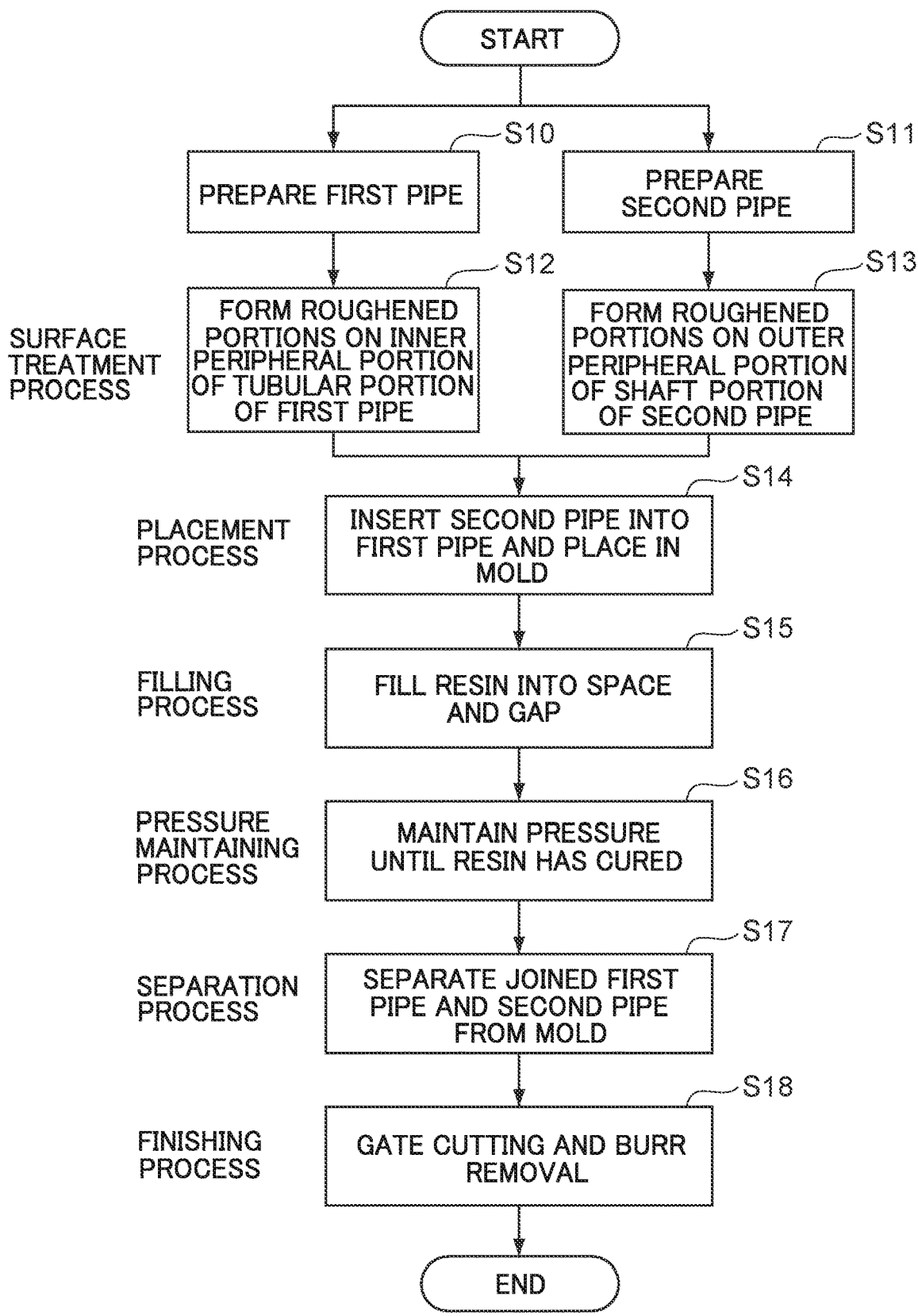
FIG. 5 is a flowchart to explain manufacturing processes for a composite member according to the first exemplary embodiment.

Explanation follows regarding a manufacturing method of the composite member 10 by way of explaining the joining method according to the present exemplary embodiment. As illustrated in FIG. 5, the composite member 10 of the present exemplary embodiment undergoes a surface treatment process, a placement process, a filling process, a pressure maintaining process, a separation process, and a finishing process during manufacture.

First, in order to join the first pipe 12 and the second pipe 14 together, the first pipe 12 is prepared with a predetermined shape (step S10), and the second pipe 14 is prepared with a predetermined shape (step S11). The first pipe 12 is formed by cutting a pipe configured by an extruded aluminum alloy material to a predetermined length, and mechanically processing the pipe and so on to form the predetermined shape. The second pipe 14 is also formed in its predetermined shape by cutting a pipe configured by an extruded aluminum alloy material to a predetermined length.

In the surface treatment process, the first pipe 12 and the second pipe 14 are subjected to surface roughening. Specifically, the first pipe 12 is formed with the roughened portions 24A configured from circumferential direction grooves by performing laser processing on the surface of the inner peripheral portion 24 of the tubular portion 20 (step S12). The second pipe 14 is formed with the roughened portions 42A configured from circumferential direction grooves by performing laser processing on the surface of the outer peripheral portion 42 of the shaft portion 40 (step S13).

In the placement process, the first pipe 12 and the second pipe 14 are arranged in the mold 52 of the joining device 50 (step S14). Specifically, a worker inserts the second pipe 14 into the first pipe 12, and in this inserted state, arranges the first pipe 12 and the second pipe 14 on the lower mold 54. Next, the retaining mechanism 60 actuates the first drive device to lower the upper mold 56 and mate the upper mold 56 with the lower mold 54 (see FIG. 3). The second drive device of the retaining mechanism 60 is also actuated to insert the insert 58 into the inner peripheral portion 44 of the second pipe 14 (the shaft portion 40) from the first pipe 12 side.

The placement process described above arranges the first pipe 12, the second pipe 14, the mold 52, and the insert 58 in the predetermined placement relationship. The gap 30 is thereby formed between the inner peripheral portion 24 of the tubular portion 20 and the outer peripheral portion 42 of the shaft portion 40, and the space 32 is formed at the portion bordered by the tubular portion 20, the main body 14A, and the mold 52 (see FIG. 3).

In the filling process, the molten resin R is filled into the gap 30 and the space 32 formed in the placement process (step S15). First, the resin R that has been heated to a molten state in the filling mechanism 62 is discharged in a pressurized state (for example at 30 MPa). The molten resin R flows into the mold 52 through the gate runner 56A, and then flows into the space 32. Note that since the resin R has higher viscosity than water or oil, the resin R fills the interior of the space 32 but does not immediately flow into the gap 30 that has a smaller radial direction height than the space 32. After the resin R has filled the space 32, the resin R flows into and fills the adjacent gap 30. Note that gas inside the gap 30 and the space 32 is discharged through a portion where the first pipe 12 and the second pipe 14 contact each other (for example, the insertion portion 26) as the resin R flows in.

The filling mechanism 62 maintains pressure on the resin R even after the resin R has been filled into the space 32 and the gap 30. This deforms and generates elastic force in the first pipe 12 and the second pipe 14 that are subjected to this pressure. Note that although a force toward the radial direction outside arises in the tubular portion 20 of the first pipe 12, the two axial direction ends of the outer peripheral portion 22 are supported by the first abutting portion 52A and the second abutting portion 52B of the mold 52 respectively. Accordingly, an axial direction central portion of the tubular portion 20 abuts the recess 52C of the mold 52 in a state in which the axial direction central portion bulges toward the radial direction outside. Moreover, in the second pipe 14, a force toward the radial direction inside arises in the shaft portion 40, such that the shaft portion 40 deforms toward the radial direction inside originating at a base portion on the main body 14A side of the shaft portion 40. The inner peripheral portion 44 of the shaft portion 40 accordingly abuts the insert 58 (see FIG. 4).

In the pressure maintaining process, the pressure on the resin R that has been filled into the space 32 and the gap 30 is maintained until the resin R cures (step S16). Note that the resin R cools and cures by dissipating heat into the first pipe 12, the second pipe 14, and the mold 52. Note that in order to promote curing, the cooling may be forced by circulating a coolant liquid in the mold 52 interior. It is sufficient for the resin R to be cured to an extent that a reaction force is generated with respect to the first pipe 12 and the second pipe 14 when the first pipe 12 and the second pipe 14 are removed from the mold 52. The resin section 16 is formed between the first pipe 12 and the second pipe 14 once the resin R has cured. Namely, the first pipe 12 and the second pipe 14 are joined together through the resin section 16.

In the pressure maintaining process, the pressure applied to the first pipe 12 and the second pipe 14 from the resin R decreases accompanying curing of the resin R, and the tubular portion 20 that has deformed toward the radial direction outside and the shaft portion 40 that has deformed toward the radial direction inside attempt to return to their original states due to elastic force. Accordingly, when the resin R has cured, pressure (elastic force) acts on the pressure receiving portion 16A of the resin section 16 from the tubular portion 20 and the shaft portion 40.

In the separation process, the first pipe 12 and second pipe 14 are separated from the mold 52 in a joined state (step S17). Specifically, the second drive device of the retaining mechanism 60 of the joining device 50 is actuated to pull the insert 58 out from the inner peripheral portion 44 of the second pipe 14 (the shaft portion 40), and the first drive device of the retaining mechanism 60 is actuated to separate the mold 52. A worker then removes the first pipe 12 and second pipe 14 from the mold 52 in the joined state.

In the finishing process, an excess portion arising when the resin R has cured in the gate runner 56A is cut off by performing what is known as "gate cutting". If a burr arises in the resin R at the parting line of the mold 52, a worker removes the burr either with a machine or by hand (step S18). The composite member 10 is completed by undergoing the above processes.

Summary of First Exemplary Embodiment

The joining method and joining device for the composite member 10 of the first exemplary embodiment can be summarized as follows.

In the joining method of the present exemplary embodiment, the molten resin R is filled into the gap 30 between the first pipe 12 and the second pipe 14 to join the two members together. Note that in the composite member 10 of the present exemplary embodiment, the tubular portion 20 and the shaft portion 40 configuring the gap 30 are both formed so as to be capable of deforming in the radial direction. Moreover, in the joining method of the present exemplary embodiment, the resin R filling the gap 30 is applied with pressure in the filling process so as to cause the tubular portion 20 and the shaft portion 40 to deform, and the pressure is maintained until the filled resin R has cured in the pressure maintaining process.

Figure 6:
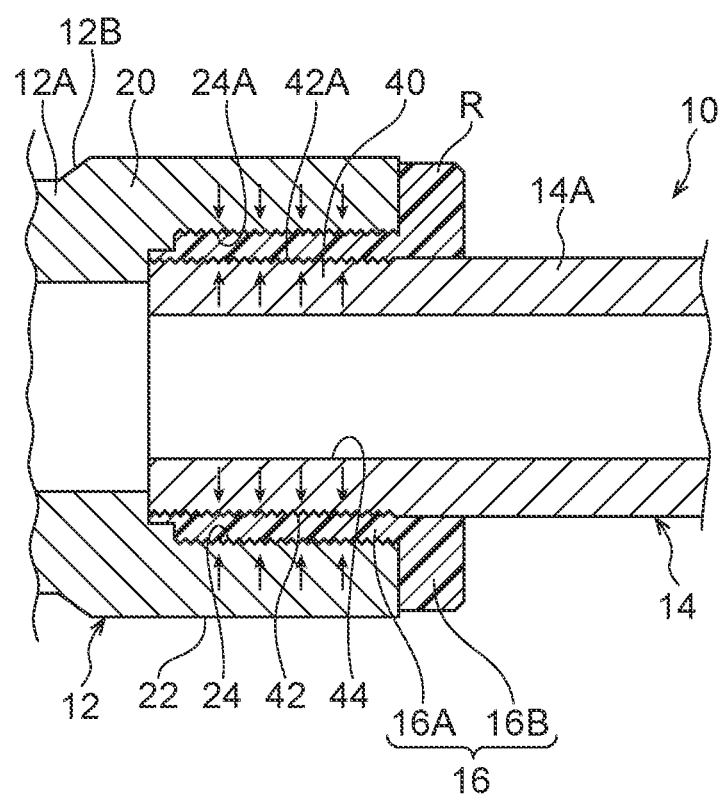
FIG. 6 is a side view cross-section of a composite member according to the first exemplary embodiment.

Until the resin R cures, a reaction force is generated due to elastic force in the tubular portion 20 and the shaft portion 40 against the pressure from the resin R (force in the direction of the arrows in FIG. 4), this being an external force. When the resin R has cured and the resin section 16 is formed, however, pressure from the resin R no longer acts on the tubular portion 20 and the shaft portion 40, and conversely the pressure receiving portion 16A of the resin section 16 receives an external force (force in the direction of the arrows in FIG. 6) due to the elastic force of the tubular portion 20 and the shaft portion 40.

Note that internal stress toward the interior of the resin R may arise as a result of contraction accompanying curing of the resin R. This internal stress acts in a direction to separate the resin section 16 from the tubular portion 20 and the shaft portion 40. In the present exemplary embodiment, the elastic force received from the tubular portion 20 and the shaft portion 40 as described above generates a reaction force from the resin section 16 toward the tubular portion 20 and the shaft portion 40, thereby enabling joint strength to be secured.

Moreover, the present exemplary embodiment is provided with abutting bodies that abut deforming members when the molten resin R is filled into the gap 30. More specifically, the joining device 50 includes the mold 52 serving as an outer abutting body that abuts the deformed tubular portion 20 of the first pipe 12, and also includes the insert 58 serving as an inner abutting body that abuts the deformed shaft portion 40 of the second pipe 14. Note that the mold 52 of the present exemplary embodiment also has a function of being a mold used to fill the resin R into the gap 30 and the space 32.

In the present exemplary embodiment, the following features are obtained due to providing the mold 52 and the insert 58 as abutting bodies. Namely, the present exemplary embodiment enables positions where elastic force is generated in the first pipe 12 and the second pipe 14 when the molten resin R has been filled into gap 30 to be controlled. If an end portion of the first pipe 12 and an end portion of the second pipe 14 did not abut the abutting bodies, there would be a possibility of the resin R filling the gap 30 leaking due to deformation of the end portion of the first pipe 12 or the end portion of the second pipe 14. If the resin R were to leak, it would no longer be possible to maintain the pressure required in order to deform the first pipe 12 and the second pipe 14. Moreover, in such cases, the deformation amounts of the first pipe 12 and the second pipe 14 would increase on progression toward their respective end portions, with the result that the elastic force received by the resin section 16 would not be uniform along the axial direction. By contrast, in the present exemplary embodiment, by controlling the positions where elastic force is generated in the first pipe 12 and the second pipe 14, leakage of the resin R during filling can be suppressed, enabling the elastic force received by the resin section 16 to be made uniform.

Moreover, in the present exemplary embodiment, plastic deformation of the first pipe 12 and the second pipe 14 can be suppressed when filling the molten resin R into the gap 30, thereby enabling the elastic force received from the first pipe 12 and the second pipe 14 after the resin R has cured to be secured. Moreover, if the shaft portion 40 of the second pipe 14 is thin, there might be a possibility of the shaft portion 40 being crushed by the pressure from the resin R. However, in the present exemplary embodiment, the insert 58 is inserted into the second pipe 14, thereby enabling the shaft portion 40 to be suppressed from being crushed by the pressure from the resin R.

Moreover, in the present exemplary embodiment, the first pipe 12 is retained by the mold 52 and the second pipe 14 is retained by the first pipe 12 and the mold 52 until the resin R cures. More specifically, in the first pipe 12, one axial direction end side of the tubular portion 20 is retained by the first abutting portion 52A of the mold 52, and the other axial direction end side of the tubular portion 20 is retained by the second abutting portion 52B of the mold 52. Moreover, in the second pipe 14, an axial direction end portion of the shaft portion 40 is retained by the insertion portion 26 of the first pipe 12, and the main body 14A is retained by the third abutting portion 52D of the mold 52.

In this manner, positioning of the first pipe 12 and the second pipe 14 is performed at locations that do not impede deformation of the respective members. This thereby enables positioning to be reliably performed when joining the members together, enabling the joining to be precise.

Moreover, the joining method of the present exemplary embodiment is well-suited to joining together tube-shaped members such as the first pipe 12 and the second pipe 14. In the present exemplary embodiment, the tube-shaped first pipe 12 and the tube-shaped second pipe 14 are joined together, enabling the ring shaped gap 30 to be provided in the composite member 10. Namely, this enables the resin section 16 configuring a join section that is continuous around the circumferential direction to be provided. The present exemplary embodiment enables a uniform reaction force to be imparted to the first pipe 12 and the second pipe 14 from the resin section 16, thereby enabling the joint strength after the resin R has cured to be improved in comparison to cases in which the resin section 16 is not continuous around the circumferential direction.

In cases in which the second pipe 14 is configured by a tube-shaped pipe, it is possible to generate elastic force by deformation of the second pipe 14 as well as of the first pipe 12. This thereby enables the joint strength between the respective members after the resin R has cured to be further improved.

The width of a portion of the space 32 formed in the present exemplary embodiment where the resin R is injected (the height H2 in FIG. 3) is greater than the width of a portion of the gap 30 where the resin R is injected (the height H1 in FIG. 3). Due to this feature, the resin R is injected into the gap 30 after having filled the space 32. Namely, the present exemplary embodiment enables the resin R to be evenly injected into the gap 30 from the space 32 after the resin R has filled the space 32.

Uneven internal stress due to the pressure of the resin R may arise when starting to fill the resin R through part of the gap 30. Uneven internal stress in the gap 30 could cause deformation of the first pipe 12 and the second pipe 14 when joined together. By contrast, in the present exemplary embodiment, the resin R is injected evenly into the gap 30 from the space 32, such that uneven internal stress due to the pressure of the resin R is less liable to occur, and deformation of the first pipe 12 and the second pipe 14 does not readily occur.

In the joining method of the present exemplary embodiment, the inner peripheral portion 24 of the tubular portion 20 and the outer peripheral portion 42 of the shaft portion 40 are respectively formed with the roughened portions 24A and the roughened portions 42A in the surface treatment process. In the composite member 10 of the present exemplary embodiment, the roughened portions 24A and the roughened portions 42A face each other across the gap 30. Moreover, the molten resin R cures in the gap 30 in a state in which the molten resin R has entered the roughened portions 24A and the roughened portions 42A to form the resin section 16. Accordingly, the first pipe 12 is anchored to the resin section 16 at the roughened portions 24A, and the second pipe 14 is anchored to the resin section 16 at the roughened portions 42A. Accordingly, in the present exemplary embodiment, the first pipe 12 and the second pipe 14 are suppressed from coming apart in the axial direction in comparison to cases in which the roughened portions 24A and the roughened portions 42A are not formed. Namely, this enables joint strength to be improved.

Note that as described above, although the roughened portions 24A and the roughened portions 42A of the present exemplary embodiment are formed as grooves running around the circumferential direction by laser processing, the method employed for surface roughening of the roughened portions 24A and the roughened portions 42A is not limited to laser processing as long as the second pipe 14 can be suppressed from coming out in the axial direction. For example, the roughened portions 24A and the roughened portions 42A may be formed by surface roughening by machining such as machine cutting or rolling, or by chemical etching. As another example of processing, a substance such as an adhesion primer that adheres to both resins and metals may be applied.

In the composite member 10 of the present exemplary embodiment, the aluminum alloy first pipe 12 and the aluminum alloy second pipe 14 are joined together. Although, members made from the same type of metal as each other are joined together in the present exemplary embodiment, there is no limitation thereto, and members made of different metals to each other may be joined together. For example, a ferrous second pipe 14 may be joined to an aluminum alloy first pipe 12. In this manner, the joining method and the joining device of the present exemplary embodiment enables metals that are poorly suited to welding to be joined together.

Although an injection molding method is employed in the filling process of the joining method of the present exemplary embodiment, other methods may be employed as long as the resin R is filled using the mold 52. For example, the resin R may be filled employing a BMC molding method, a transfer molding method, or the like.

As described above, the resin section 16 of the present exemplary embodiment secures joint strength since the pressure receiving portion 16A receives elastic force from the first pipe 12 and the second pipe 14. There is accordingly no need for the resin R to have adhesive properties. Note that in a case of a joining method employing a resin adhesive as in the related art, the resin adhesive used for joining adheres to the mold 52 and a positioning jig, such that removal of the adhered resin adhesive from the mold 52 and positioning jig occurs each time members are joined together. By contrast, in the present exemplary embodiment, there is no need to employ a resin with adhesive properties as the resin R configuring the resin section 16. Accordingly, the mold 52 does not become messy or require cleaning every time joining is performed. This results in excellent productivity in comparison to the related art.

Moreover, although the resin R applied in the present exemplary embodiment is a thermoplastic resin, there is no limitation thereto, and a thermosetting resin may be applied. Note that thermosetting resins do not readily decompose and are difficult to recycle once cured. Accordingly, a thermoplastic resin for the resin R may be used in consideration of the recyclability of the composite member 10.

Modified Examples of Composite Member

The following are modified examples of the composite member 10 of the present exemplary embodiment. Note that configurations having the same function as in the present exemplary embodiment are allocated the same reference numerals, and detailed explanation thereof is omitted.

Figure 7A:
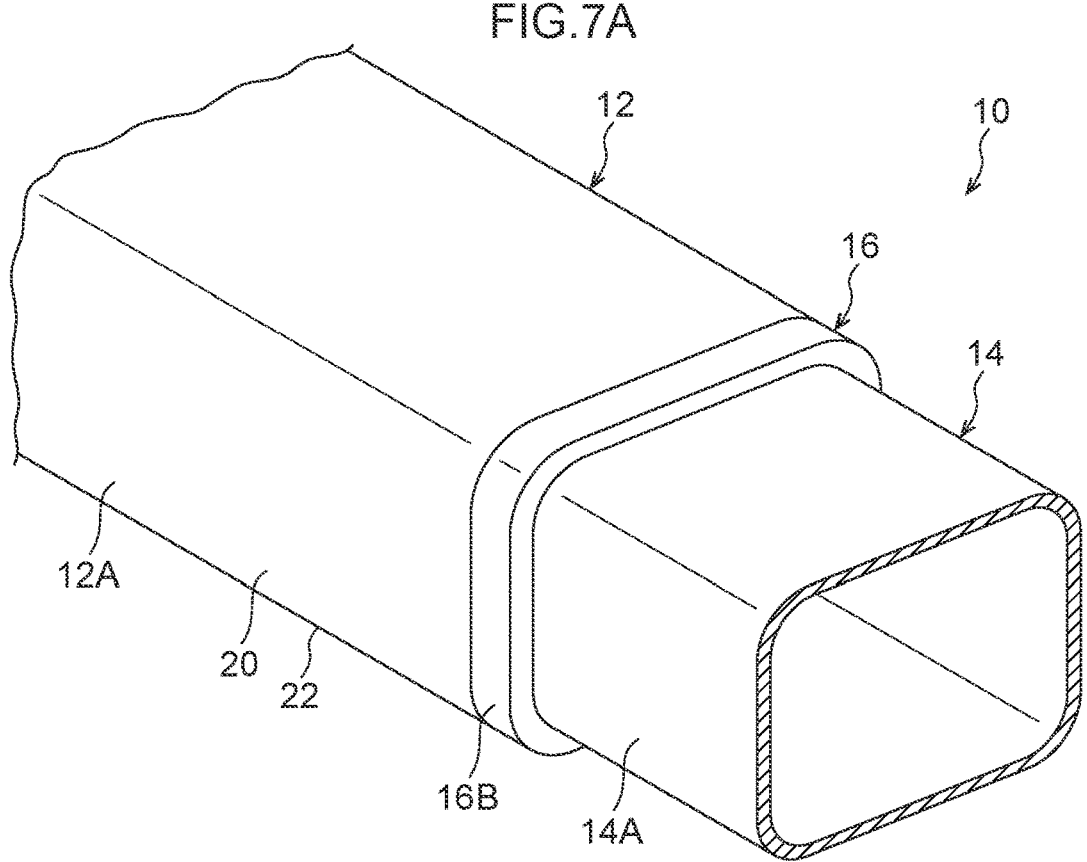
FIG. 7A is a perspective view of a composite member according to a Modified Example 1 of the first exemplary embodiment.
Figure 7B:
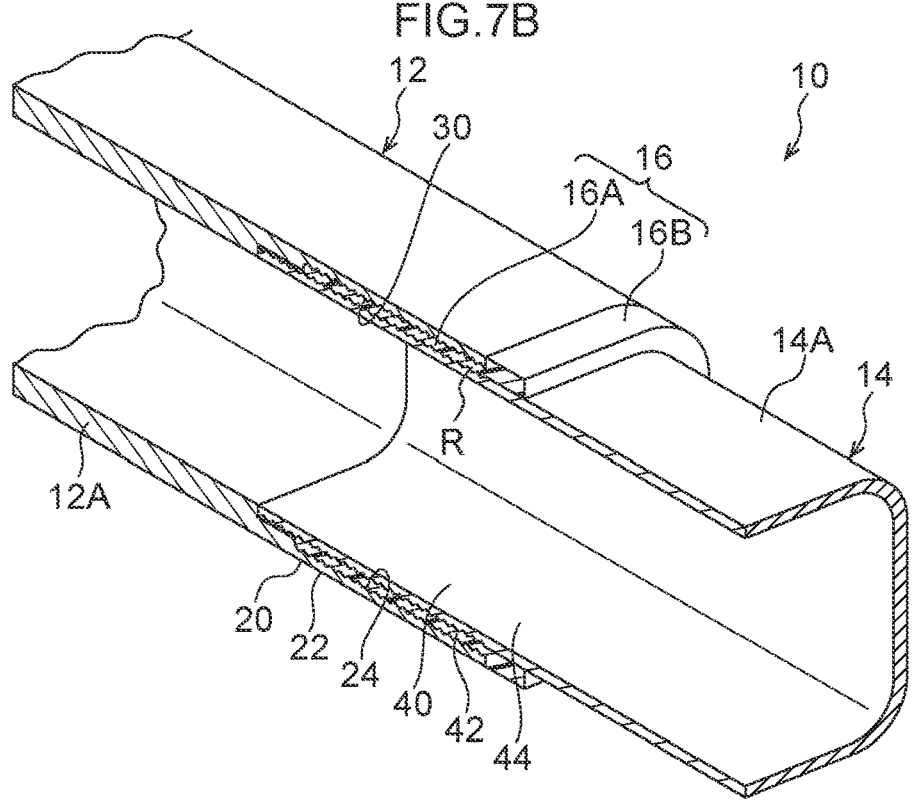
FIG. 7B is a cross-section (a cross-section of FIG. 7A) of a composite member according to Modified Example 1 of the first exemplary embodiment.

Modified Example 1 is an example in which rectangular pipes are joined together. As illustrated in FIG. 7A, a first pipe 12 of Modified Example 1 includes an elongated rectangular tube-shaped main body 12A and a rectangular tube-shaped tubular portion 20 that is adjacent to the main body 12A and has the same diameter as the main body 12A. A second pipe 14 includes an elongated rectangular tube-shaped main body 14A and a rectangular tube-shaped shaft portion 40 that is adjacent to the main body 14A and has the same diameter as the main body 14A. As illustrated in FIG. 7B, a resin section 16 of Modified Example 1 is formed in a rectangular tube shape.

A joining device 50 including a mold 52 with a rectangular cavity corresponding to the first pipe 12 and the second pipe 14, and a rectangular column shaped insert 58, is employed in the manufacture of a composite member 10 of Modified Example 1. Modified Example 1 exhibits similar operation and advantageous effects to those of the present exemplary embodiment.

Figure 8B:
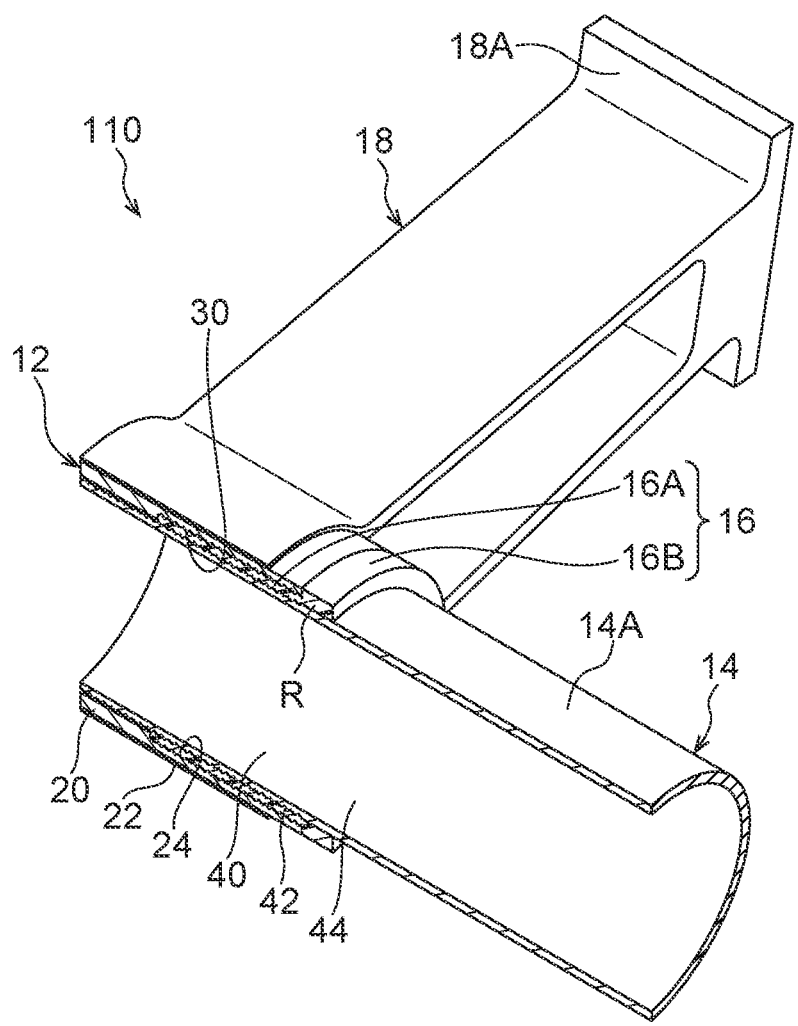
FIG. 8B is a cross-section (a cross-section of FIG. 8A) of a composite member according to Modified Example 2 of the first exemplary embodiment.

Modified Example 2 is an example in which a circular pipe and a bracket are joined together. As illustrated in FIG. 8A, in a composite member 110 of Modified Example 2, an elongated bracket 18 is connected to a first pipe 12. The elongated bracket 18 is made of an aluminum alloy, and is integrally formed to the first pipe 12. An end portion of the elongated bracket 18 on the opposite side to the first pipe 12 is provided with a flange 18A. As illustrated in FIG. 8B, in the composite member 110 of Modified Example 2, the first pipe 12 and a second pipe 14 are joined together by a resin section 16 similarly to in the present exemplary embodiment.

A mold 52 employed in the manufacture of the composite member 110 of Modified Example 2 includes a cavity with a shape corresponding to the first pipe 12, the elongated bracket 18, and the second pipe 14. Modified Example 2 also exhibits similar operation and advantageous effects to those of the present exemplary embodiment.

Modified Examples of Joining Device

The following are modified examples of the joining device 50 of the present exemplary embodiment. Note that configurations having the same function as in the present exemplary embodiment are allocated the same reference numerals, and detailed explanation thereof is omitted. A retaining mechanism 60 and a filling mechanism 62 are omitted from illustration in FIG. 9A and FIG. 10A.

Figure 9A:
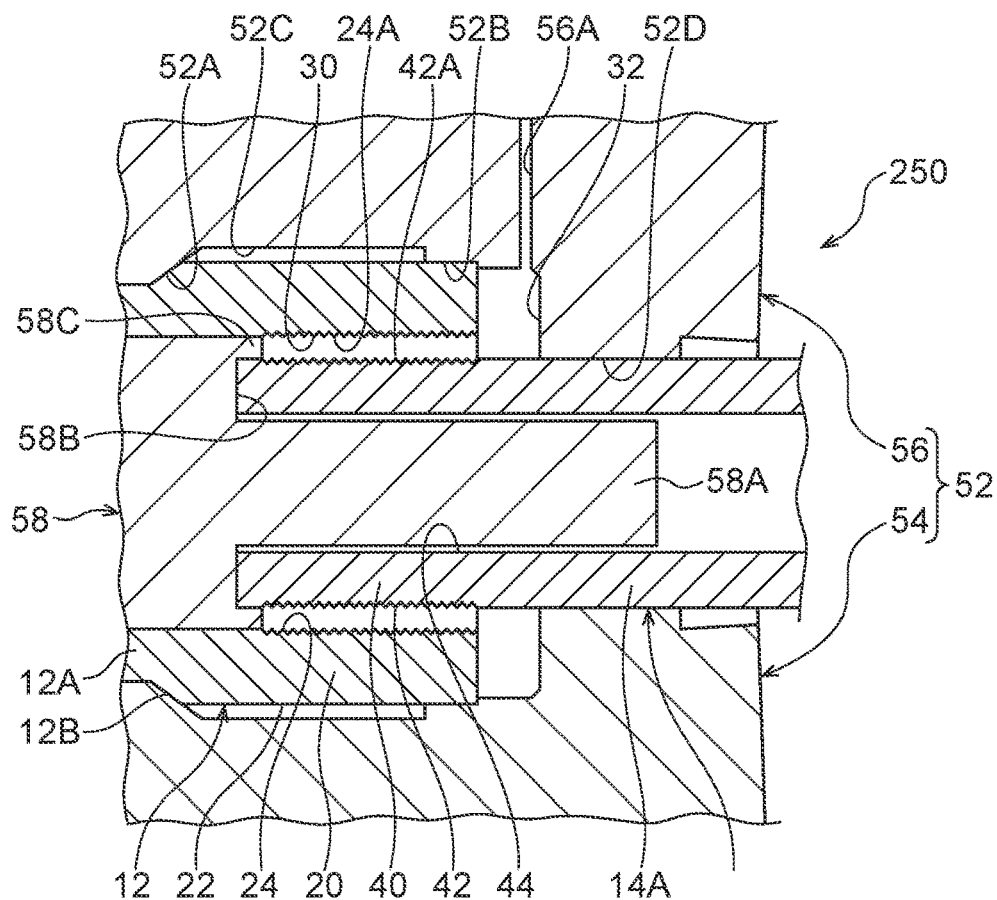
FIG. 9A is a side view cross-section of a joining device according to a Modified Example 3 of the first exemplary embodiment.

In a joining device 250 of Modified Example 3, an insert 58 differs in shape from that in the present exemplary embodiment. As illustrated in FIG. 9A, the insert 58 of Modified Example 3 includes a circular column shaped projection portion 58A that is inserted into the second pipe 14, an annular recess 58B formed around the projection portion 58A in a base portion 58D of the projection portion 58A, and an annular protrusion 58C formed at the outer periphery of the recess 58B. A first pipe 12 of a composite member 10 of Modified Example 3 is not provided with an insertion portion for insertion into a second pipe 14 (a shaft portion 40). Accordingly, in Modified Example 3, positioning is performed by inserting the second pipe 14 into the recess 58B.

Figure 9B:
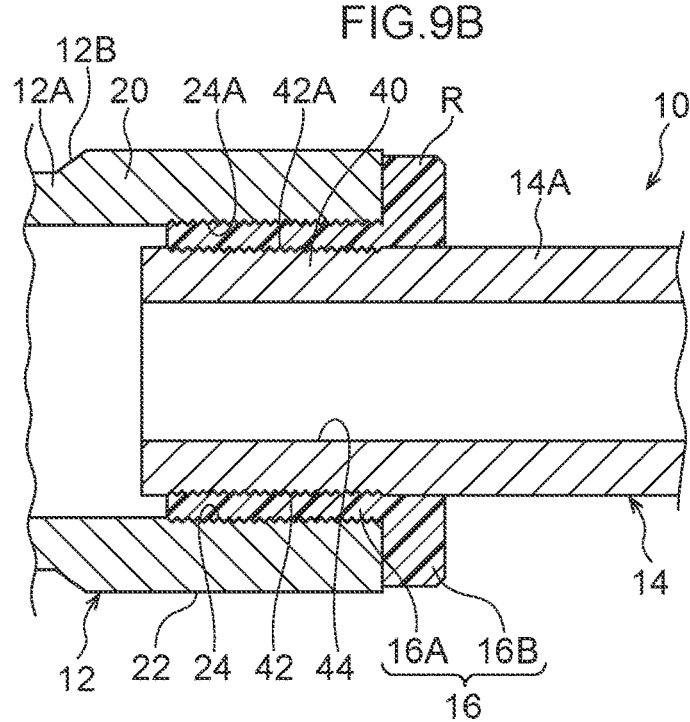
FIG. 9B is a side view cross-section of a manufactured composite member in Modified Example 3 of the first exemplary embodiment.

In Modified Example 3, a gap 30 is sealed off by the protrusion 58C, enabling pressure to be applied to the resin R during the filling process. The composite member 10 illustrated in FIG. 9B is thereby formed. Modified Example 3 also exhibits similar operation and advantageous effects to those of the present exemplary embodiment.

Figure 10A:
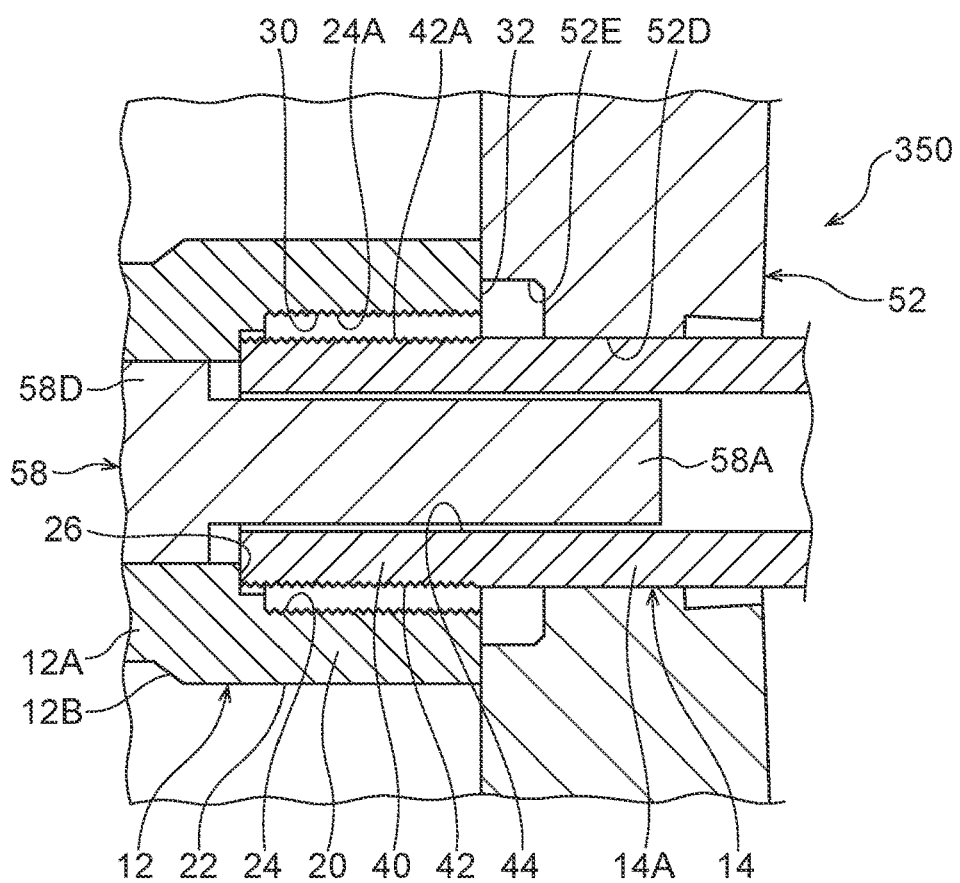
FIG. 10A is a side view cross-section of a joining device according to a Modified Example 4 of the first exemplary embodiment.

In a joining device 350 of Modified Example 4, a mold 52 differs in shape from that in the present exemplary embodiment. As illustrated in FIG. 10A, the mold 52 of Modified Example 4 includes a third abutting portion 52D that abuts an outer peripheral portion of a second pipe 14 (a main body 14A), and an annular ring shaped groove 52E formed adjacent to the third abutting portion 52D. An insert 58 of Modified Example 4 includes a circular column shaped projection portion 58A that is inserted into the second pipe 14. In Modified Example 4, positioning of a first pipe 12 can be performed at a base portion 58D of the projection portion 58A of the insert 58. Moreover, in Modified Example 4, when the first pipe 12 and the second pipe 14 have been arranged, a region bordered by the ring shaped groove 52E, an end face of a tubular portion 20, and an outer peripheral portion of the main body 14A forms a space 32. A gate runner in communication with the space 32 is formed through a side portion of the mold 52 of Modified Example 4.

Figure 10B:
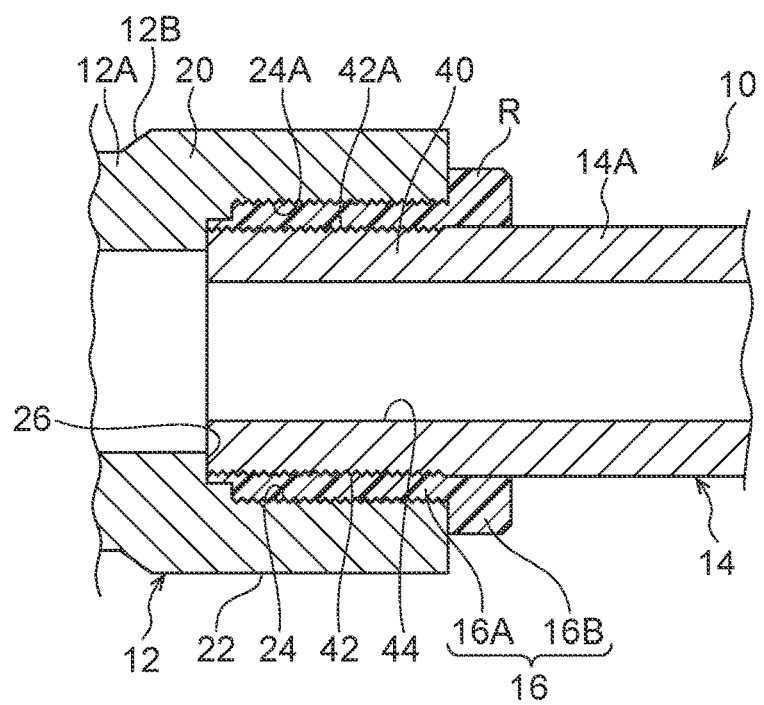
FIG. 10B is a side view cross-section of a manufactured composite member in Modified Example 4 of the first exemplary embodiment.

Unlike in the present exemplary embodiment, the mold 52 of Modified Example 4 does not include a location that abuts an outer peripheral portion 22 when the tubular portion 20 has deformed. However, when filling the molten resin R in the filling process, managing pressure such that elastic force of the tubular portion 20 can be sustained enables a composite member 10 as illustrated in FIG. 10B to be formed. Operation and advantageous effects of Modified Example 4 are substantially the same as those of the present exemplary embodiment.

Second Exemplary Embodiment

A second exemplary embodiment is an example of a composite member formed by joining together solid members. Configurations having the same function as in the first exemplary embodiment are allocated the same reference numerals, and detailed explanation thereof is omitted.

Figure 11A:
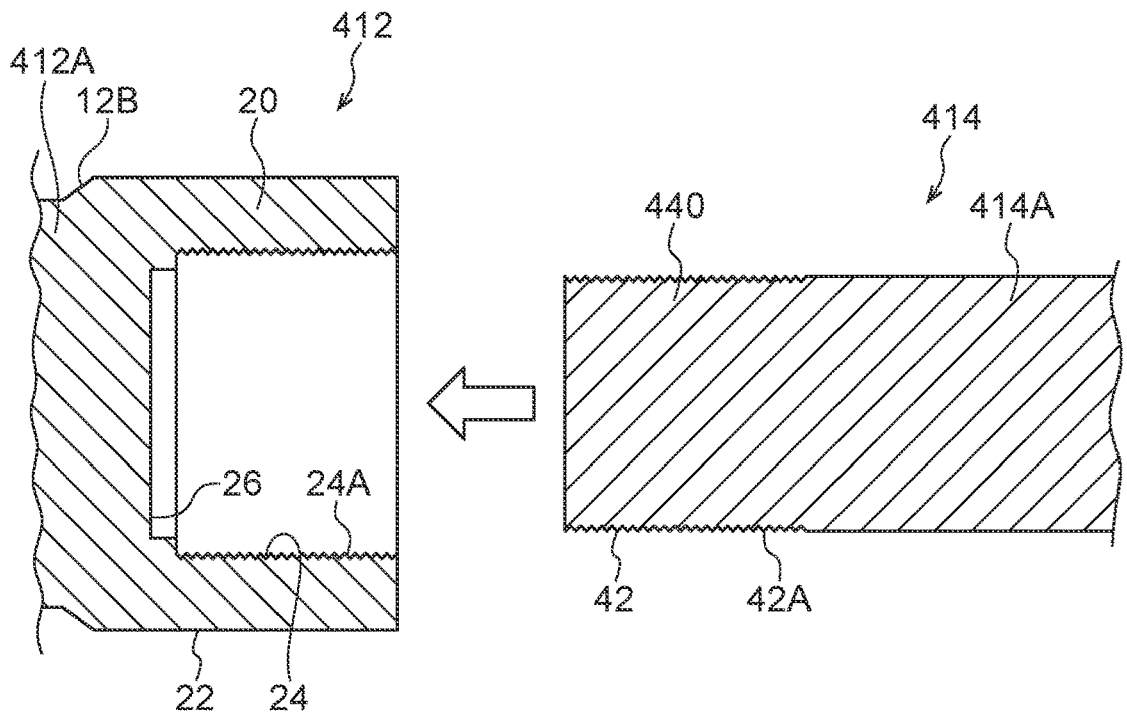
FIG. 11A is a side view cross-section of a first rod and a second rod according to a second exemplary embodiment.
Figure 11B:
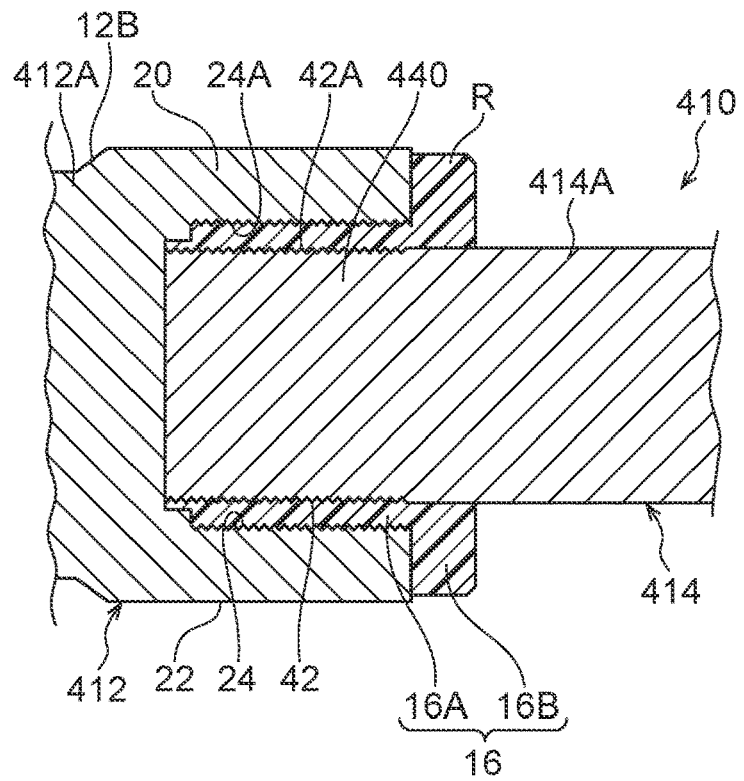
FIG. 11B is a side view cross-section of a composite member according to the second exemplary embodiment.

As illustrated in FIG. 11A and FIG. 11B, a composite member 410 of the present exemplary embodiment is configured including a rod shaped first rod 412, serving as a first member, and a rod shaped second rod 414, serving as a second member. The first rod 412 includes an elongated solid main body 412A and a circular tube-shaped tubular portion 20 that is adjacent to the solid main body 412A and has a larger external diameter than the solid main body 412A. The second rod 414 includes an elongated solid main body 414A and a solid shaft portion 440 that is adjacent to the main body 414A and has the same diameter as the main body 414A. Since the shaft portion 440 of the present exemplary embodiment is solid, a joining device 50 has no need for the insert 58 that is inserted into the shaft portion 40 in the first exemplary embodiment.

In the composite member 410 of the present exemplary embodiment, resin R is filled into a gap 30 between the first rod 412 and second rod 414 to form a resin section 16 as illustrated in FIG. 11B. In the present exemplary embodiment, the shaft portion 440 does not deform in a radial direction. Accordingly, the pressure receiving portion 16A of the resin section 16 receives elastic force from the tubular portion 20 of the first rod 412 alone.

The present exemplary embodiment configured as described above also exhibits similar operation and advantageous effects to those of the first exemplary embodiment.

Third Exemplary Embodiment

A third exemplary embodiment is an example in which a resin component is integrally formed at the same time as pipe members are joined together. Configurations having the same function as in the first exemplary embodiment are allocated the same reference numerals, and detailed explanation thereof is omitted.

Figure 12A:
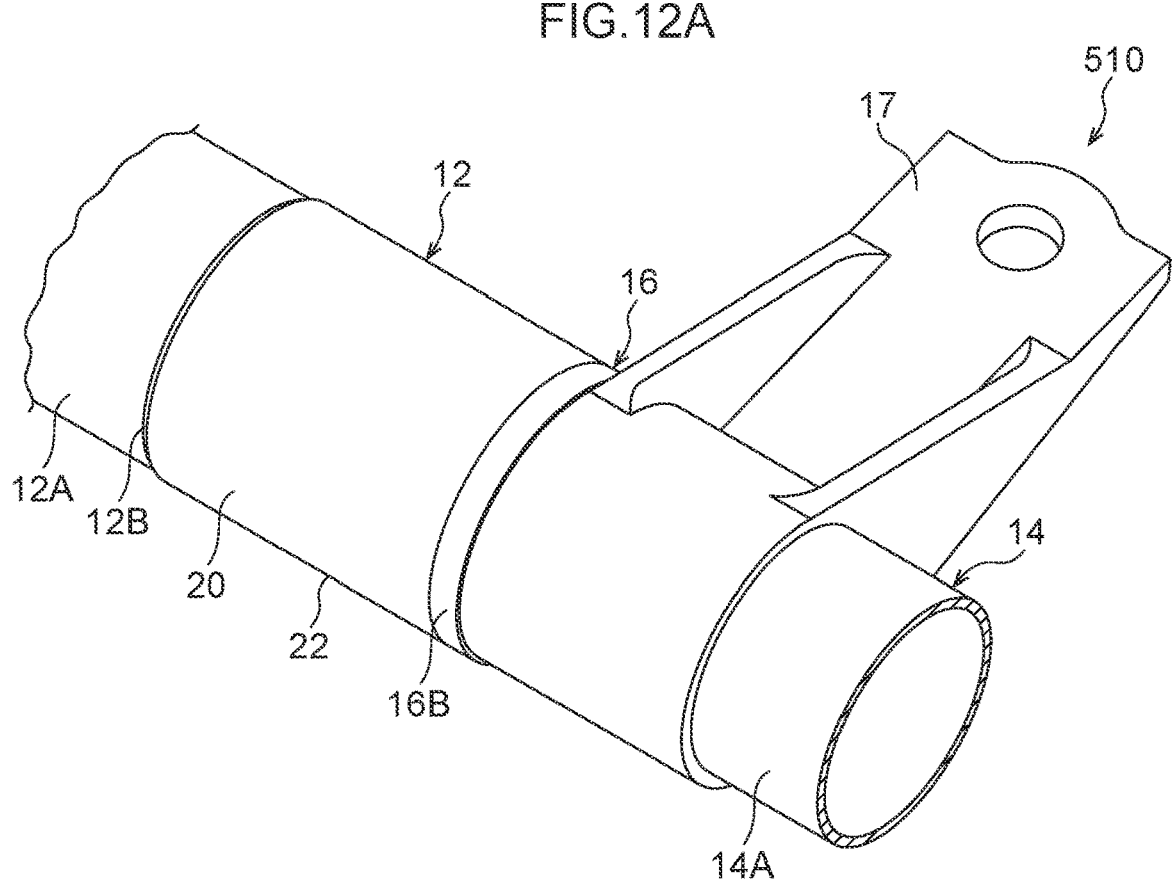
FIG. 12A is a perspective view of a composite member according to a third exemplary embodiment.
Figure 12B:
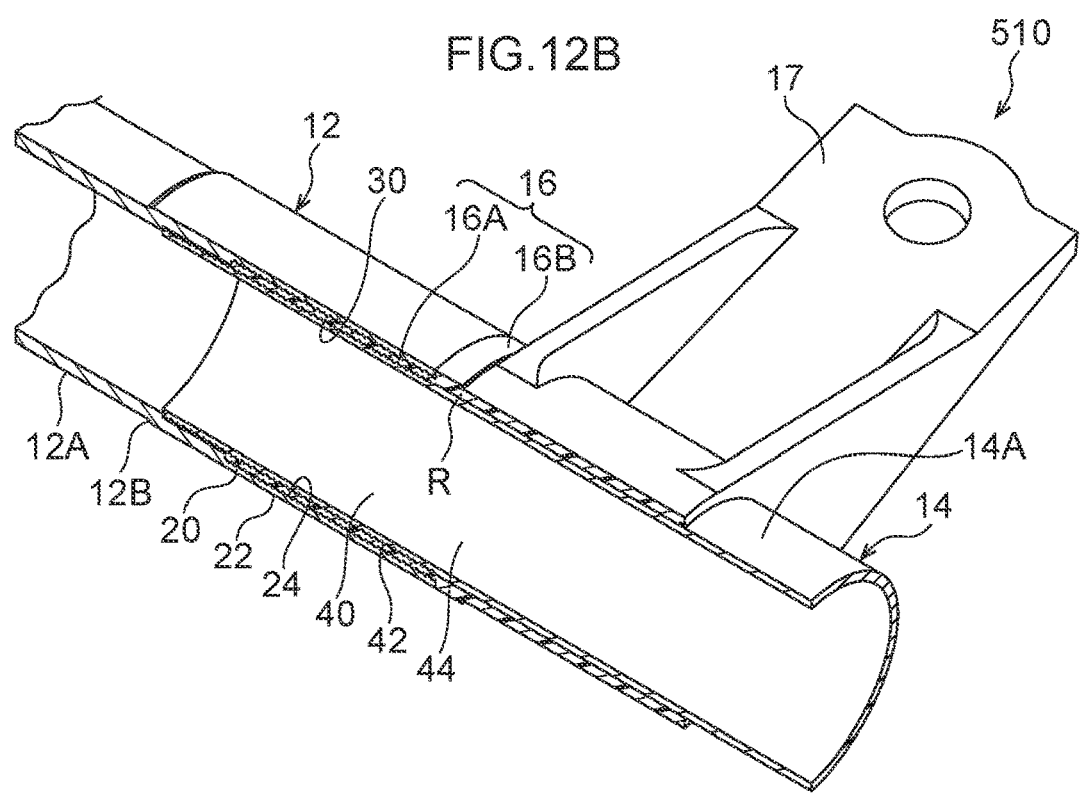
FIG. 12B is a cross-section (a cross-section of FIG. 12A) of a composite member according to the third exemplary embodiment.

As illustrated in FIG. 12A, a composite member 510 of the present exemplary embodiment is configured including a first pipe 12, a second pipe 14, a resin section 16, and a bracket 17, this being a resin component formed to an outer peripheral portion of the second pipe 14. As illustrated in FIG. 12B and FIG. 13, the bracket 17 is formed so as to be continuous to an annular portion 16B of the resin section 16.

FIG. 13 illustrates a joining device 550 of the present exemplary embodiment. Note that a retaining mechanism 60 and a filling mechanism 62 are omitted from illustration in FIG. 13.

As illustrated in FIG. 13, a mold 52 of the joining device 550 of the present exemplary embodiment is provided with a cavity 52F with a shape corresponding to the bracket 17. In the present exemplary embodiment, when the first pipe 12 and the second pipe 14 have been arranged in the mold 52, a region between a gap 30 and the cavity 52F forms a space 32. In the mold 52 of the present exemplary embodiment, resin R is injected through a gate runner 56A in communication with the space 32 and resin R is also injected through another gate runner in communication with the cavity 52R.

In addition to the advantageous effects of the first exemplary embodiment, the present exemplary embodiment also exhibits the following advantageous effects. Namely, the present exemplary embodiment enables a resin component connected to two members to be formed at the same time as joining the two members together. Namely, a resin component can be provided to a member such as a pipe without providing extra processes.

Note that although roughened portions 42A are formed at the second pipe 14 of the present exemplary embodiment at a portion corresponding to the gap 30 and the space 32, there is no limitation thereto, and the roughened portions 42A may be formed as far as a portion corresponding to the cavity 52F. This thereby enables the joint strength of the bracket 17 to the second pipe 14 to be improved.

Fourth Exemplary Embodiment

A fourth exemplary embodiment is an example of a composite member and a joining device that enable a filling state of a resin into a gap to be checked. Configurations having the same function in the first exemplary embodiment are allocated the same reference numerals, and detailed explanation thereof is omitted.

Figure 14A:
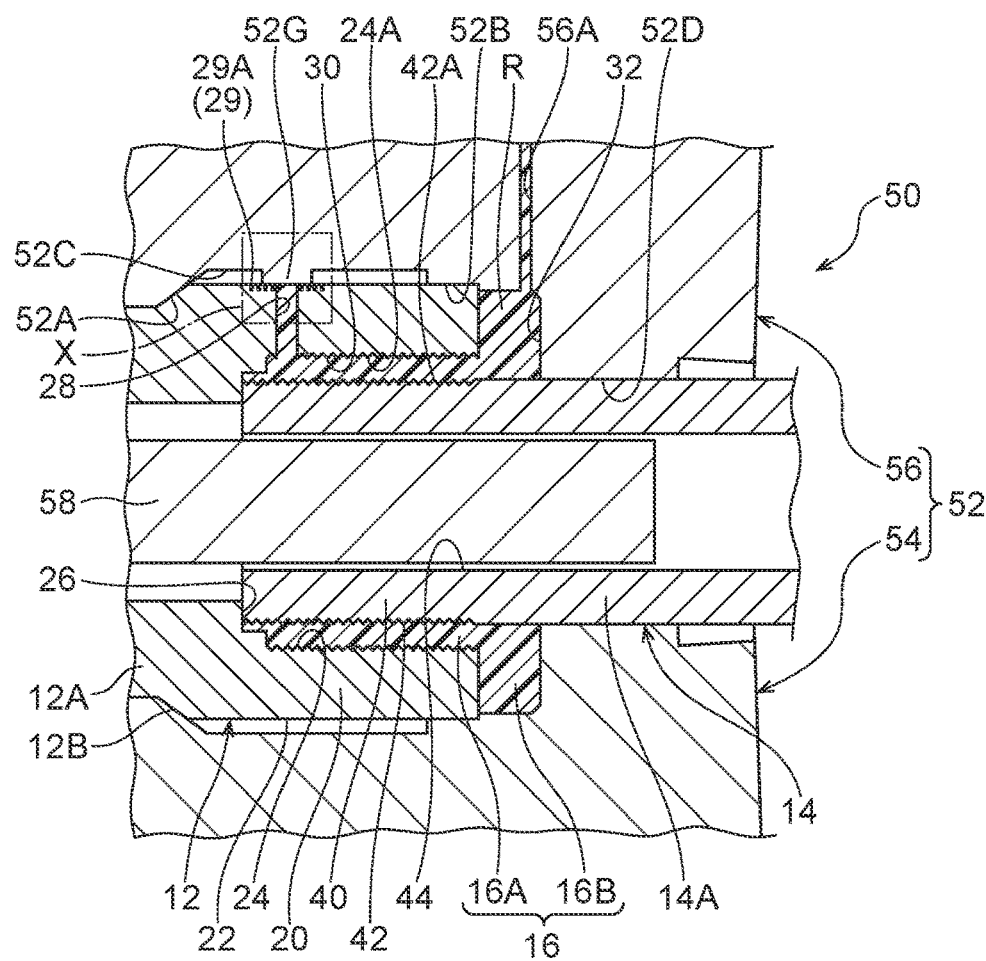
FIG. 14A is a side view cross-section of a joining device according to a fourth exemplary embodiment when a resin has been filled therein.

As illustrated in FIG. 14A, a composite member 10 of the present exemplary embodiment includes a communication path 28 that places an outer peripheral portion 22 side and an inner peripheral portion 24 side of a tubular portion 20 of a first pipe 12 in communication with each other, and that is connected to and in communication with a gap 30. A groove section 29 configured by plural grooves 29A is formed on the outer peripheral portion 22 of the tubular portion 20 at the periphery of the communication path 28. The respective plural grooves 29A configuring the groove section 29 are partially formed along a circumferential direction of the outer peripheral portion 22, and a circumferential direction side of some of the grooves 29A is connected (in communication with) the communication path 28. As an example, the grooves 29A each have a width of 0.1 mm, a depth of 0.2 mm, and a pitch between neighboring grooves 29A of 0.2 mm.

Figure 14B:
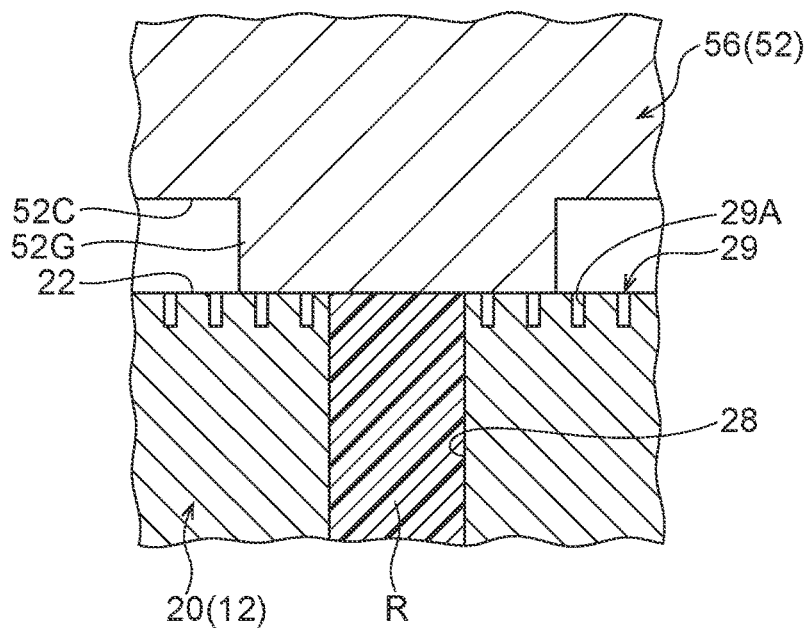
FIG. 14B is an enlarged view (corresponding to region X in FIG. 14A) of a joining device according to the fourth exemplary embodiment, illustrating the vicinity of a communication path and a covering portion.

As illustrated in FIG. 14B, the mold 52 is formed with a covering portion 52G that projects from a recess 52C toward the radial direction inside at a position opposing the communication path 28 and the groove section 29. When the first pipe 12 has been arranged in the mold 52, a radial direction inside face of the covering portion 52G partially covers the communication path 28 and the groove section 29.

Similarly to in the first exemplary embodiment, the composite member 10 of the present exemplary embodiment is manufactured by undergoing a surface treatment process, a placement process, a filling process, a pressure maintaining process, a separation process, and a finishing process. Explanation only follows regarding elements that have been added to the processes of the first exemplary embodiment.

A process to form the groove section 29 after forming (or before forming) roughened portions 24A to the first pipe 12 is added to the surface treatment process. Specifically, the outer peripheral portion 22 of the tubular portion 20 is subjected to laser processing to form the groove section 29 configured from the plural grooves 29A. Note that the groove section 29 may be formed prior to forming the communication path 28, or may be formed after forming the communication path 28.

In the placement process, the first pipe 12 and the second pipe 14 are arranged in the mold 52 of the joining device 50. When this is performed, a worker performs alignment in the circumferential direction such that the covering portion 52G covers the communication path 28 and the groove section 29.

In the filling process, molten resin R is filled through a space 32 and the gap 30 so as to reach the communication path 28 and the groove section 29. Note that when the resin R that has filled as far as the communication path 28 overflows from the communication path 28, the resin R flows into the grooves 29A connected to the communication path 28. When the resin R overflows from the grooves 29A, the resin R may spread thinly across the surface of the groove section 29 (see FIG. 15C).

Figure 15A:
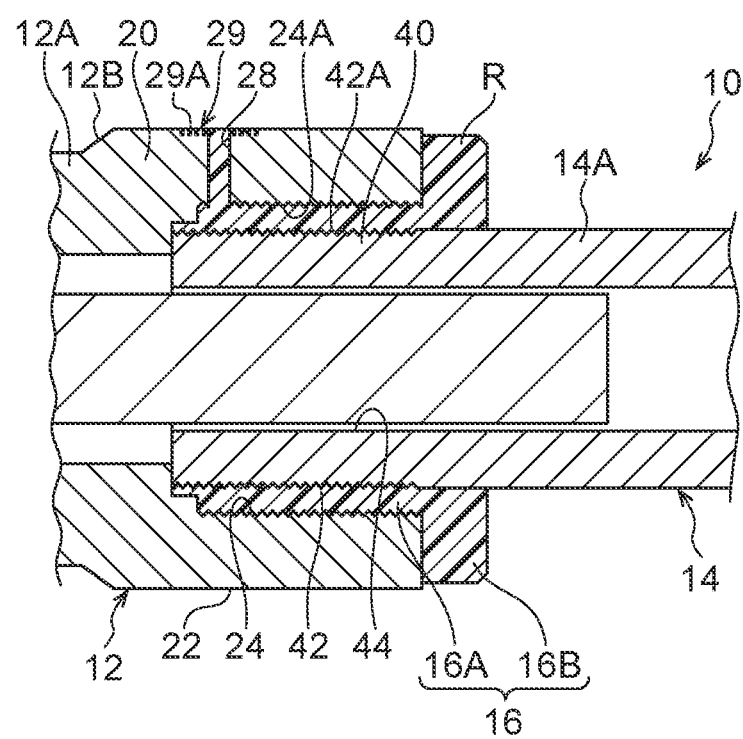
FIG. 15A is a side view cross-section of a composite member according to the fourth exemplary embodiment.

The composite member 10 illustrated in FIG. 15A is formed by being subjected to each of the above processes.

In addition to the advantageous effects of the first exemplary embodiment, the present exemplary embodiment also exhibits the following advantageous effects. Namely, in the joining method of the present exemplary embodiment, since the communication path 28 of the first pipe 12 is connected to the gap 30, when the resin R has filled the gap 30 in the filling process, the resin R then flows into the communication path 28. Accordingly, when the resin R has been filled until it reaches the communication path 28, the filling state of the resin R into the gap 30 can be ascertained by inspecting the communication path 28 of the completed composite member 10.

Figure 15B:
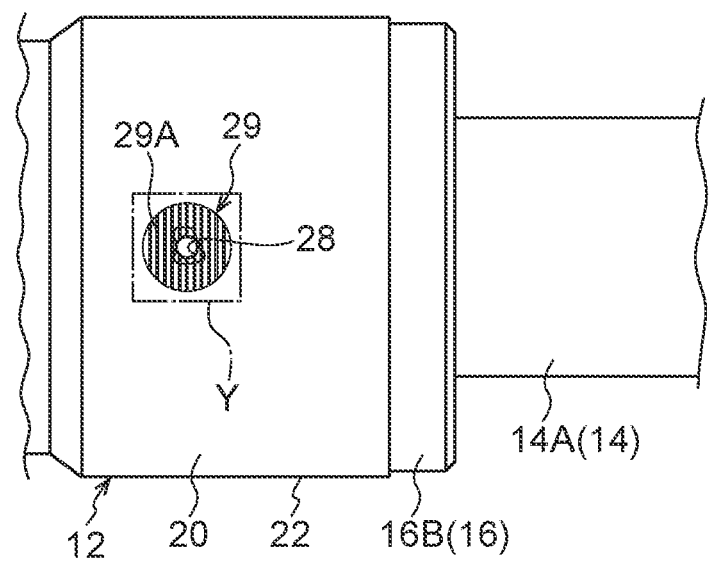
FIG. 15B is a plan view of a tubular portion of a composite member according to the fourth exemplary embodiment.

Moreover, in the composite member 10 of the present exemplary embodiment, in addition to the communication path 28, the groove section 29 configured from the plural grooves 29A is formed at the periphery of the communication path 28. As illustrated in FIG. 15B, the communication path 28 is connected to some of the grooves 29A of the groove section 29. During the filling process, the first pipe 12 abuts the mold 52 such that the covering portion 52G covers the communication path 28 and the groove section 29. Accordingly, in the present exemplary embodiment, the resin R that has filled the gap 30 and the communication path 28 then leaks out from the communication path 28 into the grooves 29A.

Figure 15C:
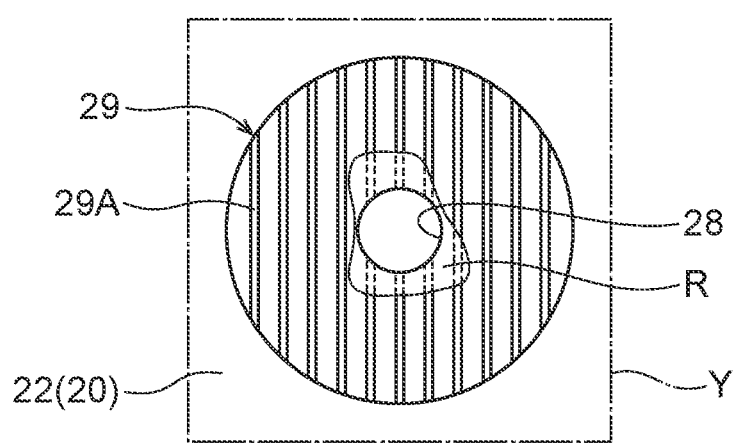
FIG. 15C is an enlarged view of the vicinity of a groove section (a region Y FIG. 15B) of a composite member according to the fourth exemplary embodiment.

In the present exemplary embodiment described above, when the resin R has been filled until it reaches the groove section 29, it is possible to ascertain the filling condition of the resin R into the gap 30 by inspecting the surface of the first pipe 12 of the completed composite member 10. Note that when checking the filling condition of the resin R using the groove section 29, as illustrated in FIG. 15C, the distribution condition of the resin R in plan view can be checked by eye, and is thus easy for a worker to ascertain. Even in cases in which the resin R has not entered the groove section 29, it is possible to check the filling state of the resin R by inspecting the communication path 28 as described above. The present exemplary embodiment enables easier quality control of the join between the first pipe 12 and the second pipe 14 in the manufactured composite member 10.

Note that in the present exemplary embodiment, there is no limitation to forming a single communication path 28 to the first pipe 12, and plural communication paths mays be formed about the circumferential direction. Moreover, although the grooves 29A of the groove section 29 are formed so as to run along the circumferential direction in the present exemplary embodiment, there is no limitation thereto, and the grooves 29A may be formed in a radiating pattern centered on the communication path 28.

Other Exemplary Embodiments

The following exemplary embodiments may also be applied in the present disclosure in addition to the respective exemplary embodiments described above. Note that configurations having the same function as in the first exemplary embodiment are allocated the same reference numerals, and detailed explanation thereof is omitted.

Figure 16A:
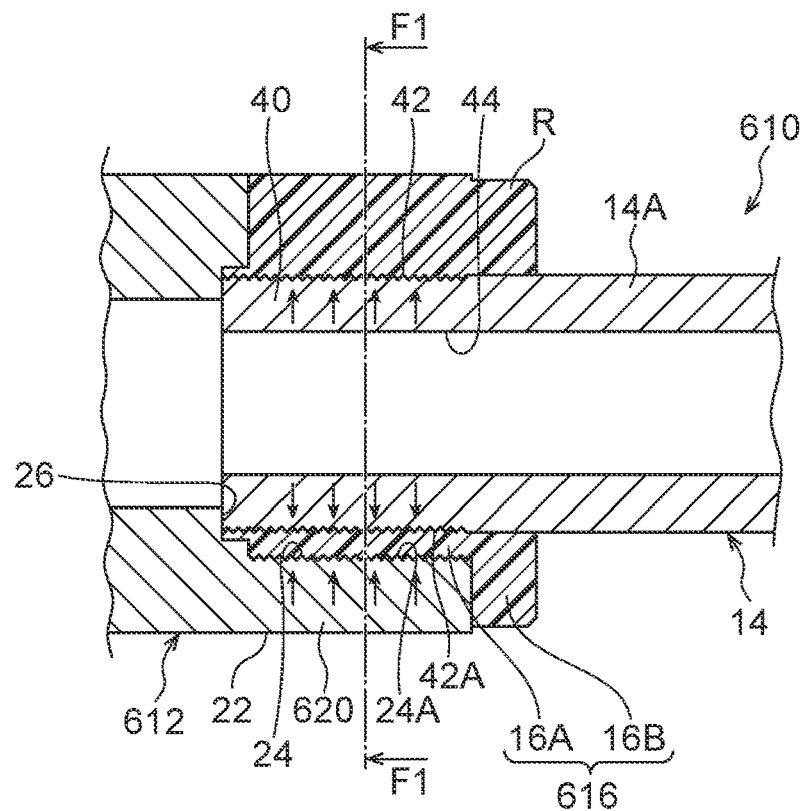
FIG. 16A is a side view cross-section of a composite member as an example of a composite member according to another exemplary embodiment.
Figure 16B:
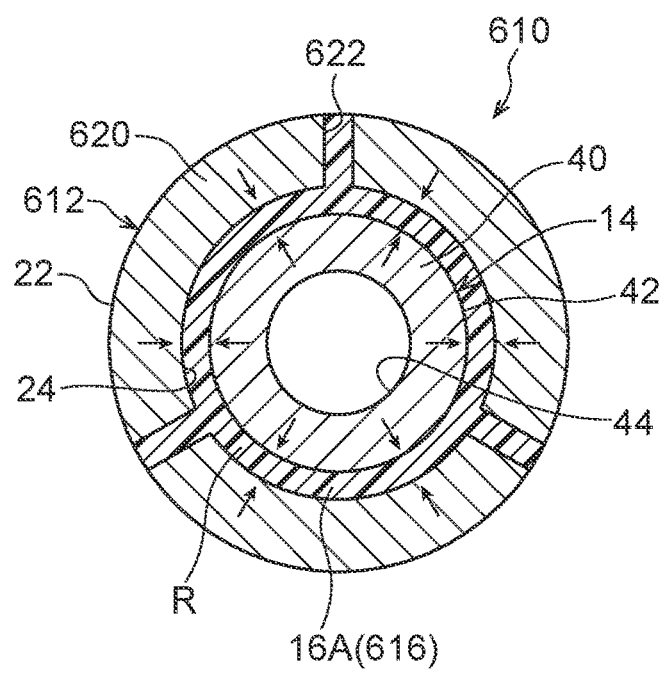
FIG. 16B is a cross-section taken along line F1-F1 in FIG. 16A, as an example of a composite member according to another exemplary embodiment.

For example, as illustrated in FIG. 16A, a composite member 610 may be formed by a first pipe 612 including a substantially circular tube-shaped tubular portion 620 divided into three segments around the circumferential direction, and a second pipe 14. The tubular portion 620 is divided into three segments around the circumferential direction by three notches 622 extending along the axial direction. Note that it is sufficient that there be plural of the notches 622 and the segments, and there is no limitation to three of each. A resin section 616 can still be formed as a join section surrounding a shaft portion 40 of the second pipe 14 even though the tubular portion 620 is divided. In particular, in cases in which the tubular portion 620 is thick, an elastic deformation amount thereof can be adjusted by adjusting the width and number of the notches 622. The first pipe 612 and the second pipe 14 deform during filling of resin R, enabling elastic force to be applied to the resin section 616 configured by the cured resin R as illustrated in FIG. 16B.

Figure 17A:
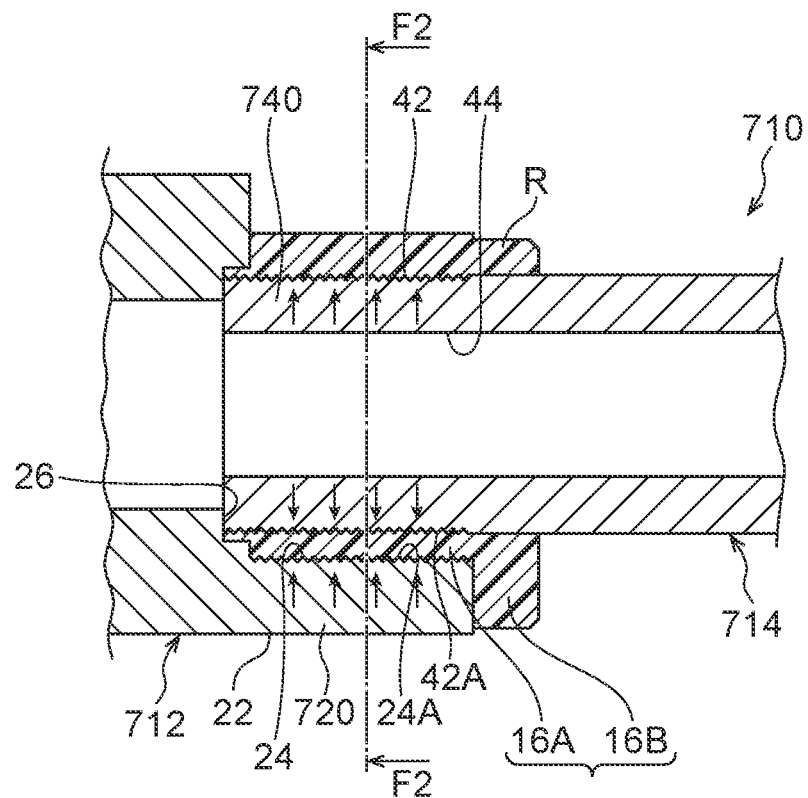
FIG. 17A is a side view cross-section of a composite member as an example of a composite member according to another exemplary embodiment.
Figure 17B:
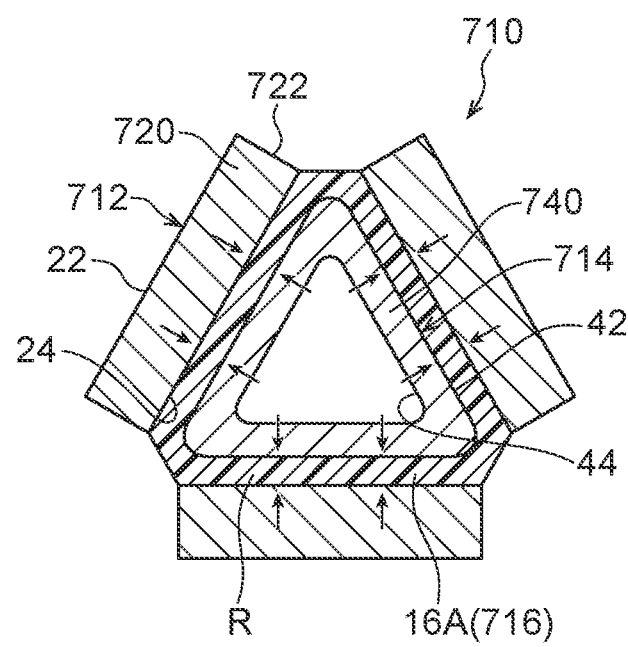
FIG. 17B is a cross-section taken along line F2-F2 in FIG. 17A, as an example of a composite member according to another exemplary embodiment.

As another example, as illustrated in FIG. 17A, a composite member 710 may be formed by a first pipe 712 including a substantially triangular tube-shaped tubular portion 720 that is divided into three segments around the circumferential direction, and a second pipe 714 including a substantially triangular tube-shaped shaft portion 740. The tubular portion 720 is divided into three segments around the circumferential direction by three notches 722 extending along the axial direction at the corners of the substantially triangular tube shape. Note that it is sufficient that there be plural of the three notches 722 and segments, and there is no limitation to three of each. A resin section 716 can still be formed as a join section surrounding the shaft portion 740 of the second pipe 714 even though the tubular portion 720 is not a circular tube shape and is divided. In particular, in cases in which the tubular portion 720 is thick, an elastic deformation amount thereof can be adjusted by adjusting the width, number, and positions of the notches 722. The first pipe 712 and the second pipe 714 deform during filling of the resin R, enabling elastic force to be applied to the resin section 716 configured by the cured resin R as illustrated in FIG. 17B.

Figure 18A:
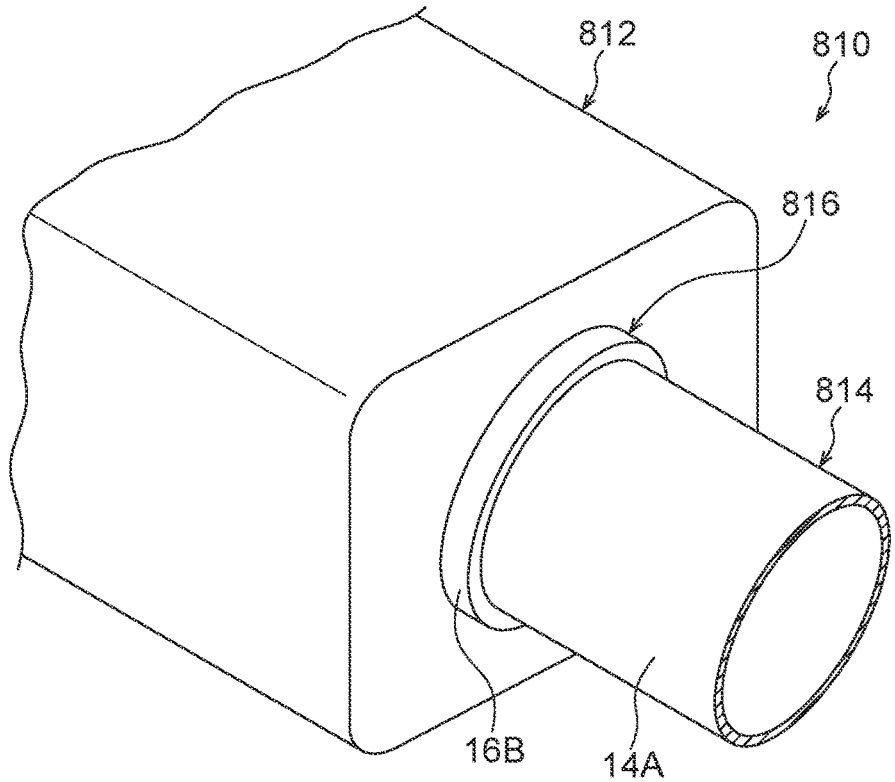
FIG. 18A is a perspective view of a composite member as an example of a composite member according to another exemplary embodiment.
Figure 18B:
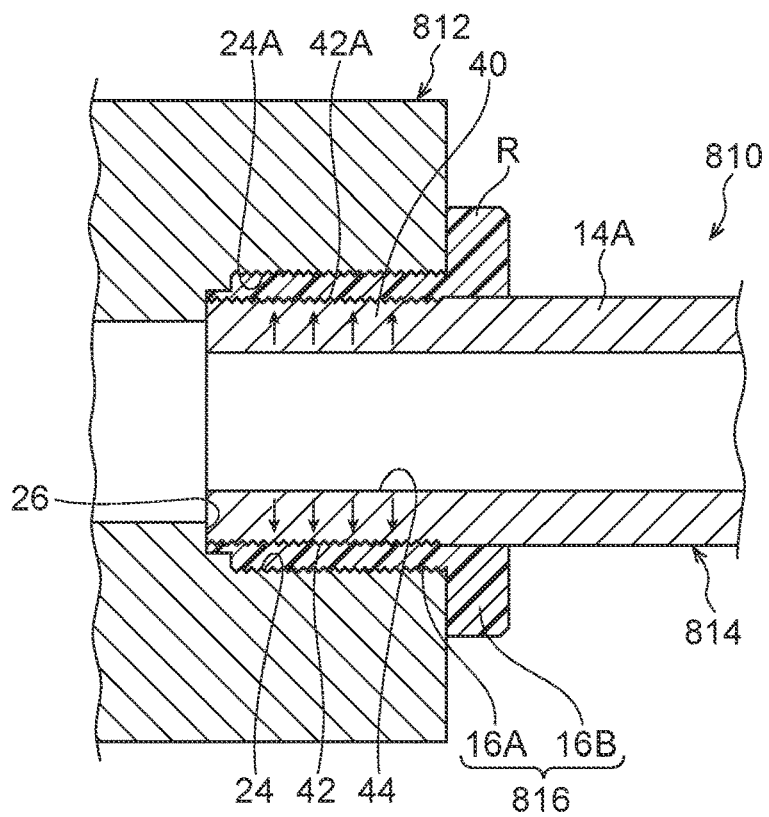
FIG. 18B is a side view cross-section of a composite member as an example of a composite member according to another exemplary embodiment.

Although both the first pipe 12 serving as a first member and the second pipe 14 serving as a second member deform in the first exemplary embodiment, and only the first rod 412 serving as a first member deforms in the second exemplary embodiment described above, there is no limitation thereto. The method of the present disclosure may be applied in a case in which only a second member inserted into the first member is made to deform. For example, as illustrated in FIG. 18A, a composite member 810 may be formed from an outer component 812 (a first member) that does not deform under filling pressure of resin R, and an inner pipe 814 (a second member). As illustrated in FIG. 18B, a resin section 816 configured of the cured resin R can be applied with elastic force, albeit only from the inner pipe 814, enabling joint strength to be secured.

Supplementary Explanation

The respective exemplary embodiments described above may be applied in combination. For example, the resin component of the third exemplary embodiment may be formed with the solid composite member of the second exemplary embodiment. As another example, the communication path and groove section of the fourth exemplary embodiment may be applied to the composite member of the third exemplary embodiment.

Although the joining methods according to the respective exemplary embodiments are applied when joining metal members together, application may be made to other members as long as elastic force of a member is maintained in the filling process. For example, lowering the pressure of the resin R in the filling process enables application to joining of non-metallic members such as resins and wood.

In addition to joining together pipes and joining a pipe to a rod member as described in the respective exemplary embodiments above, the methods of the present disclosure may also be applied to joining together components other than pipes and rod members, as long as another member is inserted into one member. In particular, since the methods of the present disclosure enable joint strength to be secured, the present disclosure is well-suited to joining vehicle members, in which consideration of strength and vibration is required. For example, application may be made to structural members such as instrument panel reinforcement or a seat frame, or to pipes such as intake pipes.

What is claimed is:

1. A member joining method comprising:
   a placement process of arranging a first member and a second member inserted into the first member so that a gap surrounding the second member is provided between the first member and the second member, a diameter of an inner peripheral portion of a main body of the first member being less than a diameter of an outer peripheral portion of the second member, an inner diameter of the first member becoming progressively smaller from an inner peripheral portion of a tubular portion of the first member toward the inner peripheral portion of the main body;
   a filling process of filling a molten resin into the gap and applying pressure to the resin so as to cause at least one member of the first member or the second member to undergo elastic deformation, the inner diameter of the first member remaining progressively smaller after the filling process; and
   a pressure maintaining process of maintaining the pressure until the resin that has been filled into the gap has cured.

2. The member joining method of claim 1, wherein:
   in the placement process, an abutting body is arranged so as to abut the at least one member undergoing elastic deformation; and
   the member joining method further comprises a separation process of separating the abutting body from the joined first member and second member after the pressure maintaining process.

3. The member joining method of claim 2, wherein:
   in the filling process, the molten resin is filled into the gap and into a cavity provided in the abutting body; and
   in the separation process, the abutting body is separated from a resin component that is continuously formed along a join section between the first member and the second member and that has a shape corresponding to the cavity.

4. The member joining method of claim 2, wherein:
in the placement process, an outer abutting body configuring the abutting body is arranged at an outer peripheral side of the tubular portion; and
in the filling process, a diameter of the tubular portion is enlarged so as to abut an inner peripheral portion of the outer abutting body.

5. The member joining method of claim 4, wherein the tubular portion is divided into segments around a circumferential direction thereof by a plurality of notches that extend along an axial direction of the tubular portion.

6. The member joining method of claim 4, wherein:
the first member includes one or more communication paths that place an outer peripheral portion side and an inner peripheral portion side of the tubular portion in communication with each other, and that are connected to the gap; and
in the filling process, the resin is filled such that the resin reaches the one or more communication paths.

7. The member joining method of claim 6, further comprising:
a process of forming a groove section configured from a plurality of grooves on an outer peripheral portion of the first member at a periphery of the one or more communication paths, wherein:
in the placement process, the first member is abutted by the abutting body such that the one or more communication paths and the groove section are covered, and
in the filling process, the resin is filled so as to pass through the one or more communication paths to reach the groove section.

8. The member joining method of claim 4, wherein:
in the placement process, the second member and the outer abutting body are arranged so as to form a space between the outer abutting body and the second member, a portion of the space that is adjacent to the gap and into which the resin is injected having a greater width than the gap; and
in the filling process, the resin passes through the space before filling into the gap.

9. The member joining method of claim 2, wherein:
the second member includes a tube-shaped shaft portion;
in the placement process, an inner abutting body configuring the abutting body is arranged at an inner peripheral side of the shaft portion; and
in the filling process, a diameter of the shaft portion is decreased so as to abut an outer peripheral portion of the inner abutting body.

10. The member joining method of claim 4, wherein:
the second member includes a tube-shaped shaft portion;
in the placement process, an inner abutting body configuring the abutting body is arranged at an inner peripheral side of the shaft portion; and
in the filling process, a diameter of the shaft portion is decreased so as to abut an outer peripheral portion of the inner abutting body.

11. The member joining method of claim 1, further comprising:
a surface treatment process that is performed prior to the placement process and in which a roughened portion is formed at a part of a surface of the first member and a part of a surface of the second member,
wherein, in the placement process, the gap is arranged at a portion where the roughened portion of the first member and the roughened portion of the second member face each other.

12. The member joining method of claim 1, wherein the first member includes a reduced diameter portion defining an insertion portion formed along an inner surface of the first member between the main body and the tubular portion of the first member.

13. The member joining method of claim 12, wherein the insertion portion abuts against the second member when inserted into the first member to seal an end of the gap.

* * * * *